US011469900B2

(12) United States Patent
Shibata et al.

(10) Patent No.: US 11,469,900 B2
(45) Date of Patent: Oct. 11, 2022

(54) COMMUNICATION DEVICE CAPABLE OF ESTABLISHING A WIRELESS CONNECTION WITH AN EXTERNAL DEVICE AND NON-TRANSITORY COMPUTER-READABLE RECORDING MEDIUM STORING COMPUTER-READABLE INSTRUCTIONS FOR A COMMUNICATION DEVICE

(71) Applicant: BROTHER KOGYO KABUSHIKI KAISHA, Nagoya (JP)

(72) Inventors: Takeshi Shibata, Nagoya (JP); Hiroshi Shibata, Yatomi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 88 days.

(21) Appl. No.: 17/036,049

(22) Filed: Sep. 29, 2020

(65) Prior Publication Data
US 2021/0099305 A1    Apr. 1, 2021

(30) Foreign Application Priority Data

Sep. 30, 2019    (JP) .............................. JP2019-179400

(51) Int. Cl.
*H04L 9/32*         (2006.01)
*H04W 76/10*        (2018.01)
(Continued)

(52) U.S. Cl.
CPC .......... *H04L 9/3234* (2013.01); *G06F 21/608* (2013.01); *H04L 9/30* (2013.01); *H04N 1/32778* (2013.01); *H04W 76/10* (2018.02)

(58) Field of Classification Search
CPC ......... H04L 9/3234; H04L 9/30; H04L 63/06; H04L 63/0853; H04L 63/0442;
(Continued)

(56) References Cited

U.S. PATENT DOCUMENTS

2017/0026833 A1    1/2017 Goto
2018/0069718 A1    3/2018 Terao
(Continued)

FOREIGN PATENT DOCUMENTS

EP    3 313 047 A1    4/2018
EP    3 547 731 A1    10/2019
(Continued)

OTHER PUBLICATIONS

Wi-Fi Alliance: "Device Provisioning Protocol Specification Version 1.0", Wi-Fi Alliance, Apr. 9, 2018 (Apr. 9, 2018). XP055632290, Retrieved from the Internet: URL:https://www.wi-fi.org/download. php?file=/sites/default/files/private/ Device Provisioning Protocol Specification v1.0.pdf, [retrieved on Oct. 15, 2019]—pp. 21-24.
(Continued)

*Primary Examiner* — Juan M Guillermety
(74) *Attorney, Agent, or Firm* — Scully, Scott, Murphy & Presser, PC

(57) ABSTRACT

A communication device may cause an output unit to output first specific information obtained by using a first public key in a case where a first specific signal is received from a first external device, receive a first authentication request in which the first public key is used from the first external device which has obtained the first public key, send a first authentication response to the first external device in a case where the first authentication request is received from the first external device, and establish a first wireless connection with the first external device in a case where the first authentication response is sent to the first external device.

20 Claims, 11 Drawing Sheets

(51) Int. Cl.
    *G06F 21/60*     (2013.01)
    *H04L 9/30*      (2006.01)
    *H04N 1/327*     (2006.01)

(58) Field of Classification Search
    CPC . G06F 21/608; H04N 1/32778; H04W 76/10; H04W 12/06; H04W 12/77; H04W 12/50
    See application file for complete search history.

(56) References Cited

U.S. PATENT DOCUMENTS

| | | | |
|---|---|---|---|
| 2018/0069851 A1* | 3/2018 | Terao | H04W 12/06 |
| 2018/0077255 A1 | 3/2018 | Goto | |
| 2018/0124860 A1 | 5/2018 | Moritomo | |
| 2018/0213578 A1 | 7/2018 | Tachibana | |
| 2018/0213585 A1 | 7/2018 | Moritomo | |
| 2019/0110204 A1 | 4/2019 | Goto | |
| 2019/0196761 A1 | 6/2019 | Minakawa et al. | |
| 2019/0320317 A1 | 10/2019 | Sakai | |
| 2020/0146101 A1* | 5/2020 | Tsuboi | H04W 12/06 |
| 2020/0228974 A1* | 7/2020 | Miyake | H04W 12/06 |

FOREIGN PATENT DOCUMENTS

| | | |
|---|---|---|
| EP | 3 675 540 A1 | 7/2020 |
| JP | 2008-134985 A | 6/2008 |
| JP | 2016-0213573 A | 12/2016 |
| JP | 2017-028454 A | 2/2017 |
| JP | 2017-028459 A | 2/2017 |
| JP | 2017-028460 A | 2/2017 |
| JP | 2018-006983 A | 1/2018 |
| JP | 2018-037978 A | 3/2018 |
| JP | 2019-114910 A | 7/2019 |

OTHER PUBLICATIONS

Extended European Search Report dated Jan. 29, 2021 from related EP 20198659.3.
Device Provisioning Protocol Technical Specification Version 1.0, Wi-Fi Alliance, 24 pages, 2018.
Wi-Fi Peer-to-Peer (P2P) Technical Specification Version 1.1, Wi-Fi Alliance, 159 pages, 2010.

* cited by examiner

FIG. 2
(Overview of DPP)
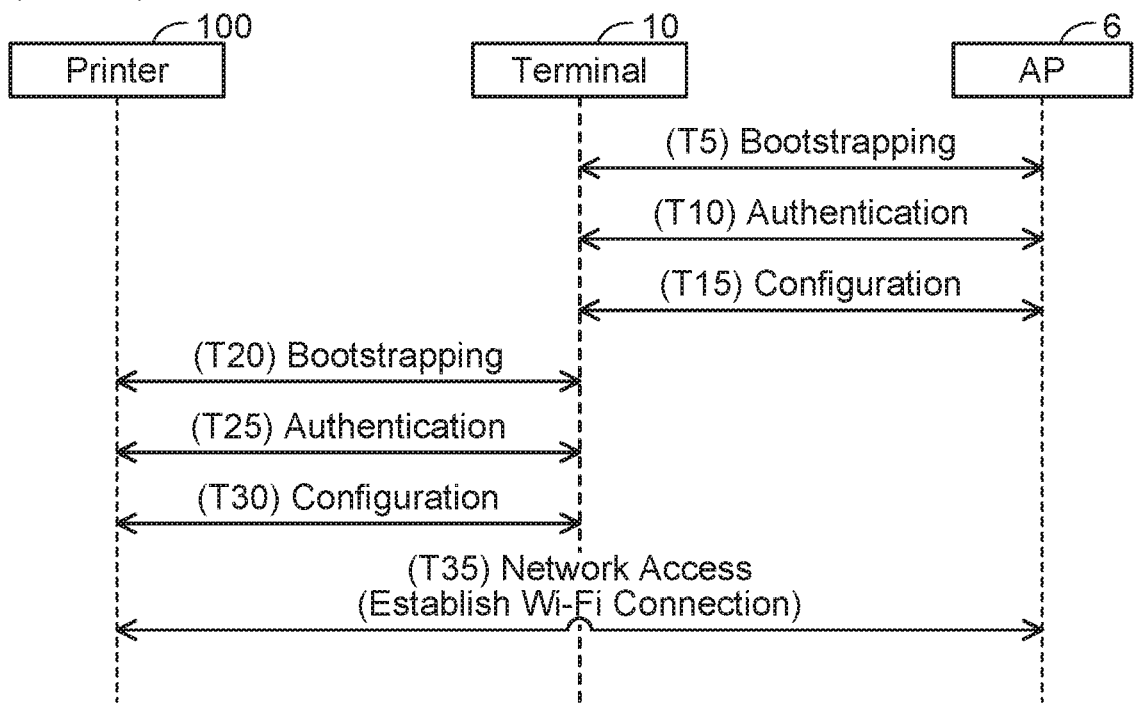
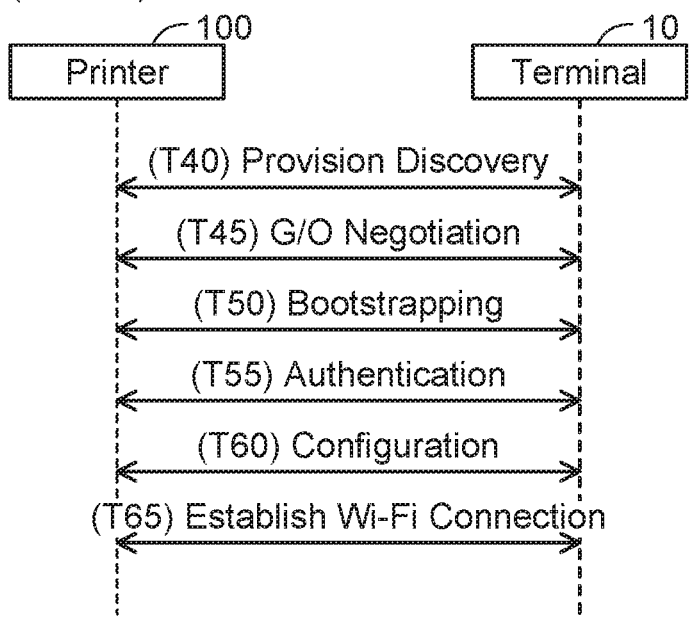

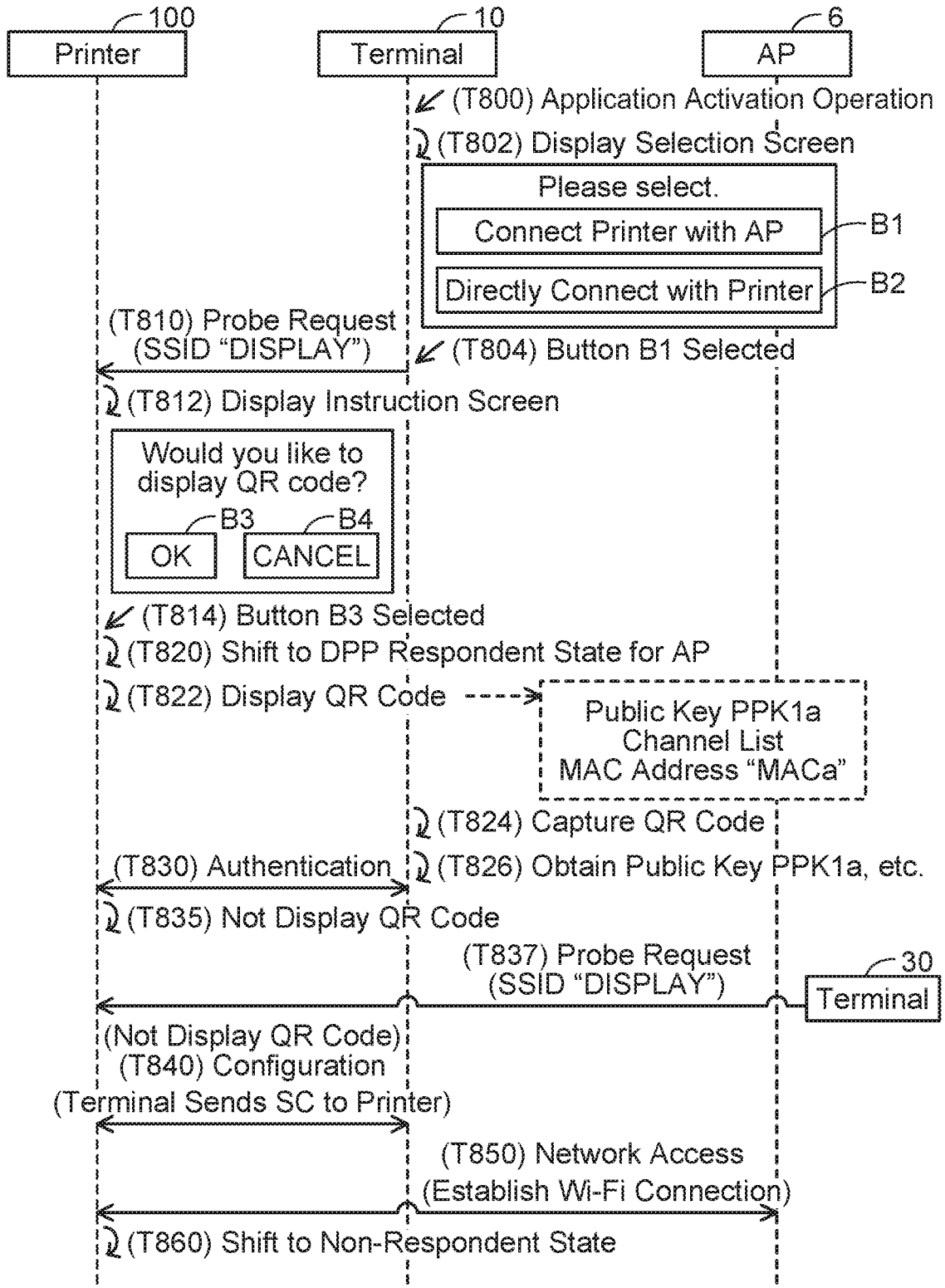

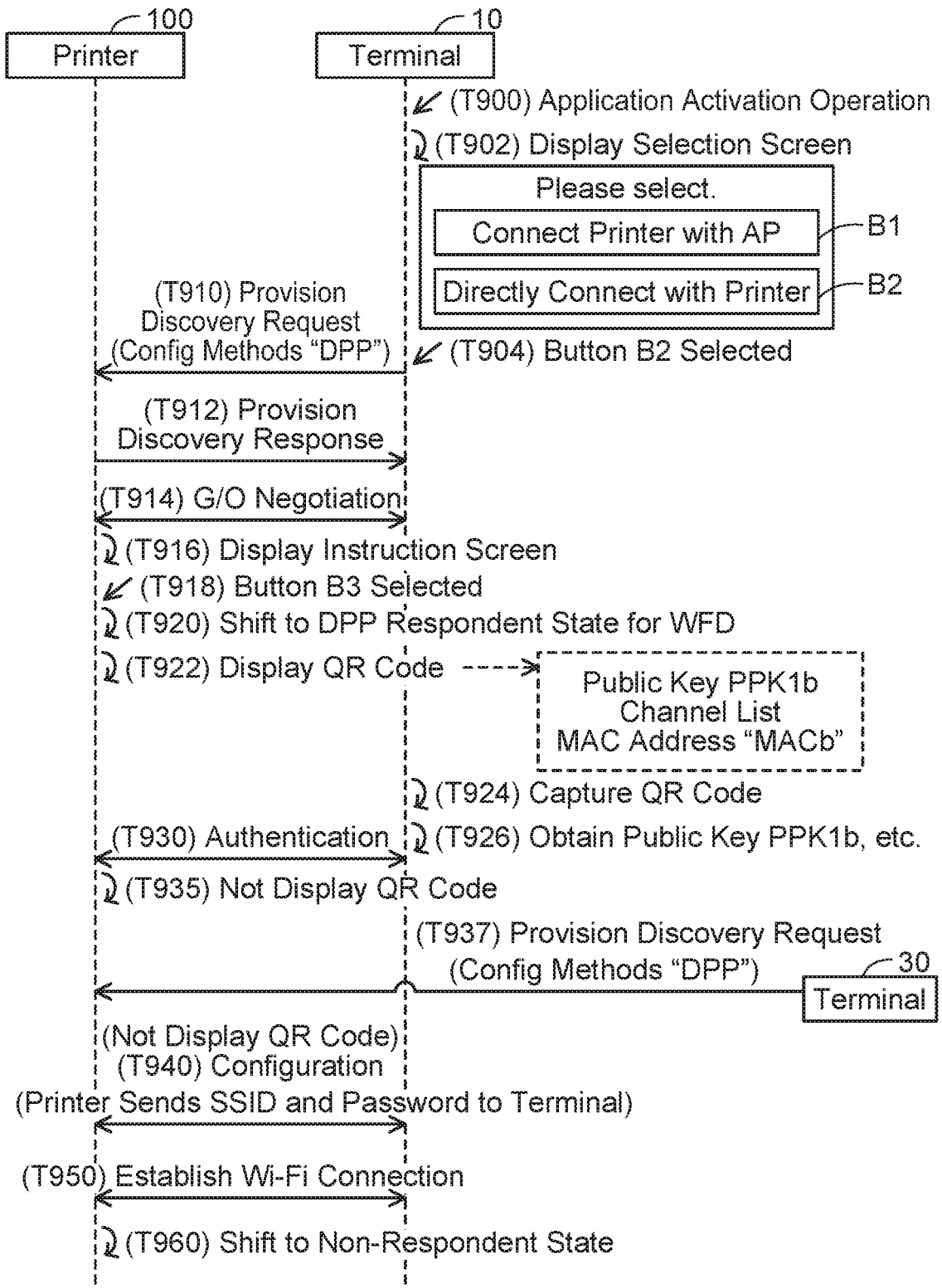

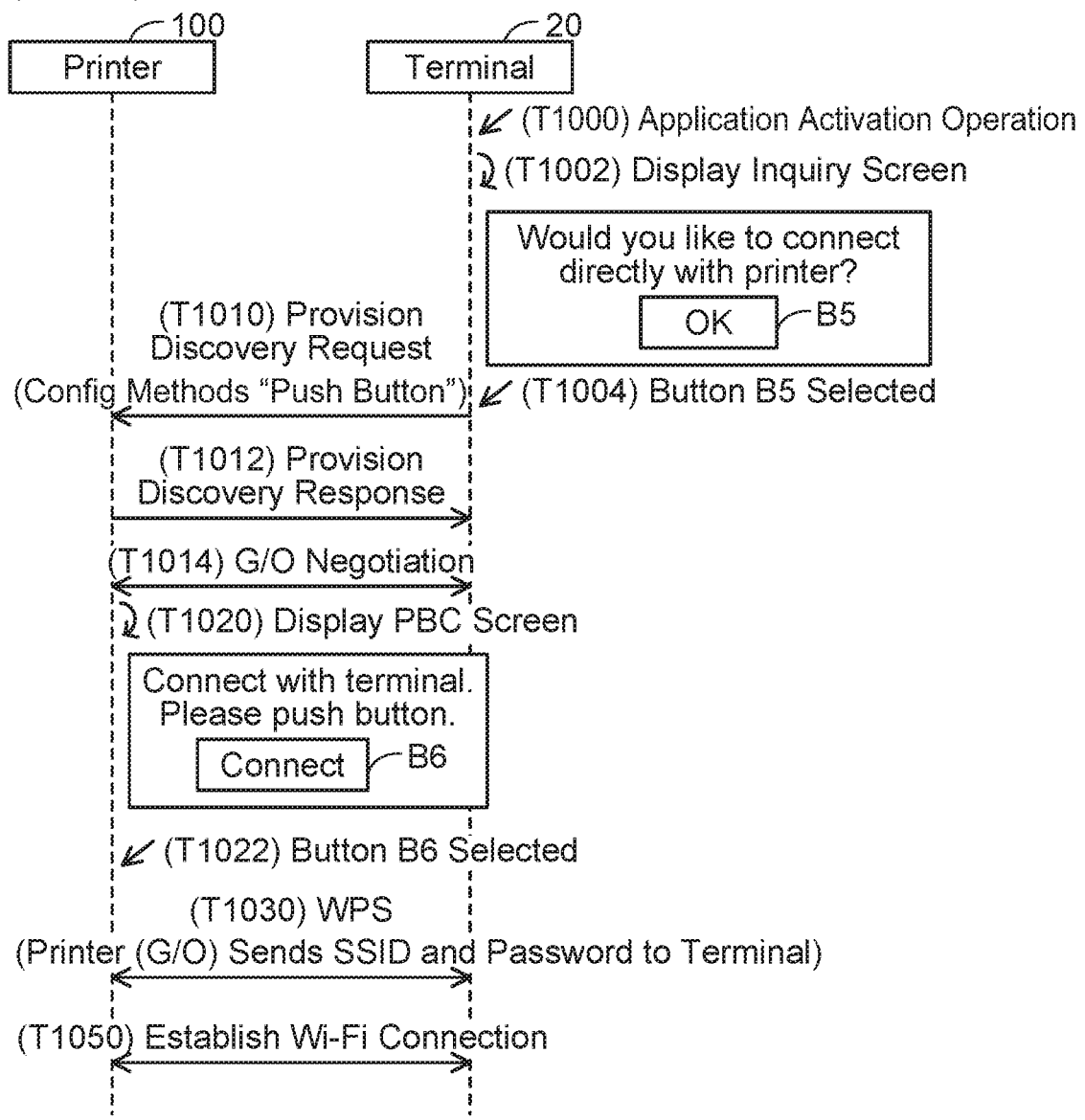

COMMUNICATION DEVICE CAPABLE OF ESTABLISHING A WIRELESS CONNECTION WITH AN EXTERNAL DEVICE AND NON-TRANSITORY COMPUTER-READABLE RECORDING MEDIUM STORING COMPUTER-READABLE INSTRUCTIONS FOR A COMMUNICATION DEVICE

CROSS-REFERENCE

This application claims priority to Japanese Patent Application No. 2019-179400, filed on Sep. 30, 2019, the entire contents of which are incorporated herein by reference.

TECHNICAL FIELD

The disclosure herein discloses a technique related to a communication device capable of establishing a wireless connection with an external device.

BACKGROUND ART

A technique for establishing a wireless connection between a camera and an AP using a smartphone is known. In response to accepting an operation by a user, the camera displays a QR code (registered trademark) including information for executing setting of communication parameters and starts monitoring receipt of a search signal. The smartphone obtains the information for executing the setting of the communication parameters by reading the QR code displayed on the camera, and sends a search signal to the camera. In a case of receiving the search signal from the smartphone, the camera sends a response to the smartphone in response to the search signal. In a case of receiving the response from the camera, the smartphone uses the obtained information to set the communication parameters, and sends the set communication parameters to the camera. Further, the smartphone executes similar processes with an AP and sends the communication parameters to the AP. By doing so, the camera can establish a wireless connection with the AP by using the received communication parameters.

SUMMARY

The disclosure herein discloses a novel technique for establishing a wireless connection between a communication device and an external device.

A communication device disclosed herein may comprise: an output unit; a wireless interface; a processor; and a memory storing computer-readable instructions therein, the computer-readable instructions, when executed by the processor, causing the communication device to: receive a first specific signal from a first external device via the wireless interface; in a case where the first specific signal is received from the first external device, cause the output unit to output first specific information obtained by using a first public key, wherein the first public key is obtained by the first external device due to the first specific information being outputted; receive, via the wireless interface, a first authentication request in which the first public key is used from the first external device which has obtained the first public key; in a case where the first authentication request is received from the first external device, send a first authentication response to the first external device via the wireless interface; and in a case where the first authentication response is sent to the first external device, establish a first wireless connection with the first external device via the wireless interface.

Another communication device disclosed herein may comprise: a wireless interface; a processor; and a memory storing computer-readable instructions therein, the computer-readable instructions, when executed by the processor, causing the communication device to: receive a first specific signal from a first external device via the wireless interface; in a case where the first specific signal is received from the first external device, shift an operation state of the communication device from a non-respondent state to a first respondent state, the non-respondent state being a state of not sending an authentication response, and the first respondent state being a state of sending a first authentication response in response to receiving a first authentication request including a first MAC address assigned to the wireless interface as a destination MAC address; receive the first authentication request from the first external device via the wireless interface; in a case where the first authentication request is received from the first external device after the operation state of the communication device has been shifted to the first respondent state, send the first authentication response to the first external device via the wireless interface; and in a case where the first authentication response is sent to the first external device, establish a first wireless connection with the first external device via the wireless interface.

A computer program or computer-readable instructions for realizing the above communication device, and non-transitory computer-readable recording medium that store this computer program or the computer-readable instructions are also novel and useful. Further, a method performed by the above communication device is also novel and useful. In addition, a communication system comprising the above communication device and another device (e.g., the first external device, the second external device) are also novel and useful.

BRIEF DESCRIPTION OF THE DRAWINGS

FIG. 2 shows an explanatory diagram explaining an overview of Case A in which a Wi-Fi connection is established between a printer and an AP, and Case B in which a Wi-Fi connection is established between a printer and a terminal;

FIG. 9 shows a sequence diagram of Case A;

FIG. 10 shows a sequence diagram of Case B; and

FIG. 11 shows a sequence diagram of Case C in which a Wi-Fi connection is established between a printer and a terminal.

EMBODIMENT (Configuration of Communication System 2; FIG. 1)

As shown in FIG. 1, a communication system 2 comprises an Access Point (AP) 6, a terminal 10, and a printer 100. The present embodiment discloses an art configured to enable a user of the terminal 10 to use the terminal 10 to switch between a case where a wireless connection according to a Wi-Fi scheme (hereinbelow termed "Wi-Fi connection") is established between the printer 100 and the AP 6 and a case where a Wi-Fi connection is established between the terminal 10 and the printer 100.

(Configuration of Terminal 10)

Figure 1:
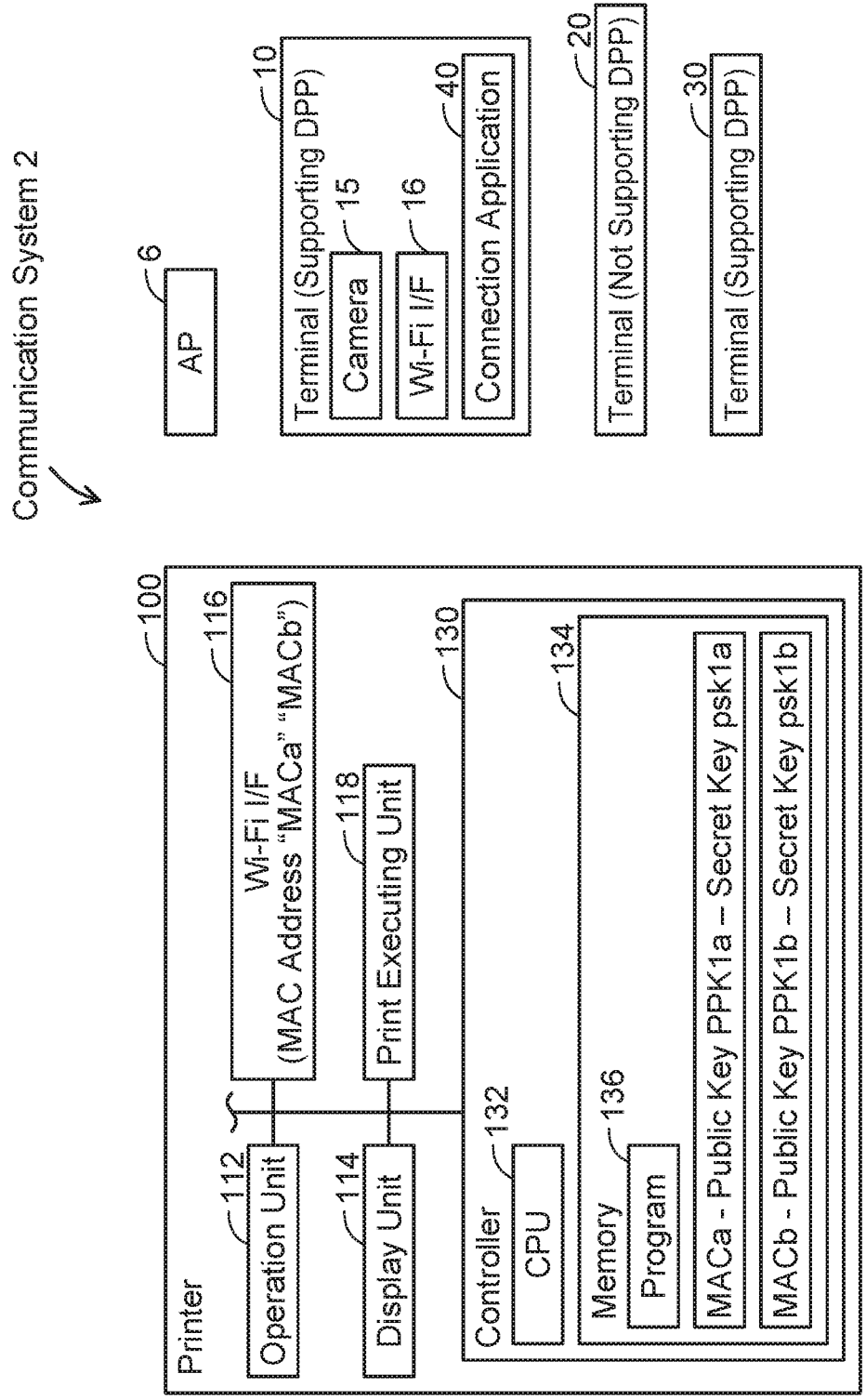
FIG. 1 shows a configuration of a communication system.

The terminal 10 is a mobile terminal device such as a cellphone (such as a smartphone), a PDA, or a tablet PC. In a variant, the terminal 10 may be a stationary PC, or a laptop PC. The terminal 10 comprises a camera 15 and a Wi-Fi interface 16. Hereinbelow, an interface will be denoted simply as "I/F". The camera 15 is a device for capturing an image of an object, and in this embodiment, it is used especially to capture a QR code for the AP 6 and the printer 100. Further, the terminal 10 stores a connection application 40 (hereinbelow termed simply as "app 40"). The app 40 is a program for establishing the Wi-Fi connection between the printer 100 and the AP 6, and may be installed to the terminal 10, for example, from a server on the Internet provided by a vendor of the printer 100.

The Wi-Fi I/F 16 is a wireless interface configured to execute Wi-Fi communication according to the Wi-Fi scheme. The Wi-Fi scheme is a wireless communication scheme for executing a wireless communication according to 802.11 standard of IEEE (the Institute of Electrical and Electronics Engineers, Inc.) and standards complying thereto (such as 802.11a, 11b, 11g, 11n, 11ac, etc.), for example. The Wi-Fi I/F 16 especially supports a Wi-Fi Direct (WFD) scheme and a Device Provisioning Protocol (DPP) scheme that are established by the Wi-Fi Alliance.

The WFD scheme is a connection scheme described in the standard "Wi-Fi Peer-to-Peer (P2P) Technical Specification Version 1.1" established by the Wi-Fi Alliance. In the WFD, a Group Owner state of operating as a parent station of a wireless network (hereinbelow termed "G/O state") and a client state of operating as a child station in the wireless network (hereinbelow termed "CL state") are defined.

The DPP scheme is described in the standard "Device Provisioning Protocol Specification Version 1.1" created by the Wi-Fi Alliance, and is a wireless communication scheme for easily establishing a Wi-Fi connection between a pair of devices (such as the printer 100 and the AP 6, or the printer 100 and the terminal 10) by using the terminal 10.

(Configurations of Terminals 20 and 30)

The terminal 20 has an identical configuration as the terminal 10. However, the terminal 20 supports the WFD scheme but does not support the DPP scheme. The terminal 30 has an identical configuration as the terminal 10 and supports both the WFD scheme and the DPP scheme.

(Configuration of Printer 100)

The printer 100 is a peripheral (e.g., a peripheral of the terminal 10) capable of executing a print function. The printer 100 comprises an operation unit 112, a display unit 114, a Wi-Fi I/F 116, a print executing unit 118, and a controller 130. The respective units 112 to 130 are connected to a bus line (for which a reference sign is not given).

The operation unit 112 comprises a plurality of keys. The user can input various instructions to the printer 100 by operating the operation unit 112. The display unit 114 is a display configured to display various types of information. The Wi-Fi I/F 116 is similar to the Wi-Fi I/F 16 of the terminal 10. That is, the Wi-Fi I/F 116 supports the WFD scheme and the DPP scheme. Further, the Wi-Fi I/F 116 is assigned with two MAC addresses "MACa" and "MACb". "MACa" is a MAC address used for establishing a Wi-Fi connection with the AP 6. "MACb" is a MAC address used for establishing a Wi-Fi connection with the terminal 10.

The print executing unit 118 includes a print mechanism of an inkjet scheme or a laser scheme.

The controller 130 comprises a CPU 132 and a memory 134. The CPU 132 executes various processes according to a program 136 stored in the memory 134. The memory 134 is constituted of a volatile memory, a nonvolatile memory and/or the like. The memory 134 further stores the MAC address "MACa", a public key PPK1$a$, and a secret key psk1$a$ in association with each other and stores the MAC address "MACb", a public key PPK1$b$, and a secret key psk1$b$ in association with each other. The public key PPK1$a$ and the secret key psk1$a$ are information used to establish a Wi-Fi connection with the AP 6. The public key PPK1$b$ and the secret key psk1$b$ are information used to establish a Wi-Fi connection with the terminal 10.

(Overview of Present Embodiment; FIG. 2)

Next an overview of the present embodiment will be described with reference to FIG. 2. The AP 6 also supports the DPP scheme. In the present embodiment, establishment of the Wi-Fi connection between the AP 6 and the printer 100 is realized in Case A by the respective devices 6, 10, 100 executing communications according to the DPP scheme. Further, in Case B, establishment of the Wi-Fi connection between the terminal 10 and the printer 100 is realized by the terminal 10 and the printer 100 executing communication according to the DPP scheme and the WFD scheme. Hereinbelow, for easier understanding, operations executed by CPUs (such as the CPU 132) of the respective devices will be described with the respective devices (such as the printer 100) as a subject of action instead of describing them with the CPUs as the subject of action.

(Overview of Case A)

First, an overview of Case A will be described. In T5, the terminal 10 executes Bootstrapping (hereinbelow termed simply as "BS") according to the DPP scheme with the AP 6. This BS is a process of providing information that is to be used in Authentication (hereinbelow termed simply as "Auth") of T10 (to be described later) from the AP 6 to the terminal 10 in response to a QR code adhered to the AP 6 being captured by the terminal 10.

In T10, the terminal 10 executes Auth according to the DPP scheme with the AP 6 by using the information obtained in the BS of T5. This Auth is a process for the terminal 10 and the AP 6 to authenticate their communication counterparts.

In T15, the terminal 10 executes Configuration (hereinbelow termed simply as "Config") according to the DPP scheme with the AP 6. This Config is a process of sending information for establishing the Wi-Fi connection between the printer 100 and the AP 6 to the AP 6. Specifically, in the Config, the terminal 10 creates a first Configuration Object (hereinbelow, Configuration Object is simply be termed "CO") for establishing the Wi-Fi connection between the printer 100 and the AP 6, and sends the first CO to the AP 6.

Next, the terminal 10 executes BS according to the DPP scheme with the printer 100 in T20. This BS is a process of providing information that is to be used in Auth of T25 (to be described later) from the printer 100 to the terminal 10 in response to a QR code displayed in the printer 100 being captured by the terminal 10.

In T25, the terminal 10 executes Auth according to the DPP scheme with the printer 100 by using the information obtained in the BS of T20. This Auth is a process for the terminal 10 and the printer 100 to authenticate their communication counterparts.

In T30, the terminal 10 executes Config according to the DPP scheme with the printer 100. This Config is a process of sending information for establishing the Wi-Fi connection between the printer 100 and the AP 6 to the printer 100. In this Config, the terminal 10 creates a second CO for establishing the Wi-Fi connection between the printer 100 and the AP 6, and sends the second CO to the printer 100.

In T35, the printer 100 and the AP 6 use the stored first and second COs to execute Network Access (hereinbelow termed simply as "NA") according to the DPP scheme. The NA is a process of sharing a connection key for establishing the Wi-Fi connection between the printer 100 and the AP 6. Next, the printer 100 and the AP 6 execute 4way-handshake communication. In at least a part of the 4way-handshake communication, the printer 100 and the AP 6 communicate encrypted information encrypted by the shared connection key. Further, in a case where decryption of the encrypted information succeeds, the Wi-Fi connection is established between the printer 100 and the AP 6. Due to this, the printer 100 can participate, as a child station, in a wireless network formed by the AP 6, as a result of which the printer 100 can execute communication via the AP 6 with other devices participating in the wireless network. In a variant, the printer 100 and the AP 6 may execute Simultaneous Authentication of Equals (SAE, also called "Dragonfly") communication, instead of the 4way-handshake communication.

In the DPP scheme, in order to establish the Wi-Fi connection between the printer 100 and the AP 6, the user does not need to input information of the wireless network (such as a Service Set Identifier (SSID) and a password) in which the AP 6 operates as a parent station to the printer 100. As such, the user can easily establish the Wi-Fi connection between the printer 100 and the AP 6.

(Overview of Case B)

Next, an overview of Case B will be described. In T40, the terminal 10 executes Provision Discovery (hereinbelow termed "PD") of the WFD scheme with the printer 100. The PD is a process for commonly initiating communication according to the WFD scheme between the terminal 10 and the printer 100.

In T45, the terminal 10 executes a G/O Negotiation (hereinbelow termed "GN") of the WFD scheme with the printer 100. This GN is a process of determining which one of the terminal 10 and the printer 100 is to shift to the G/O state.

In T50, the terminal 10 executes the BS of the DPP scheme with the printer 100. This BS is a process of providing information to be used in the Auth of T55 to be described later from the printer 100 to the terminal 10.

In T55, the terminal 10 uses the information obtained in the BS of T50 to execute the Auth of the DPP scheme with the printer 100. This Auth is a process for the terminal 10 and the printer 100 to authenticate their communication counterparts.

In T60, the terminal 10 executes the Config of the DPP scheme with the printer 100. This Config is a process of communicating information for establishing the Wi-Fi connection between the terminal 10 and the printer 100. The CO is sent from one of the terminal 10 and the printer 100 to the other thereof.

In T65, the terminal 10 uses the CO communicated in T60 to establish the Wi-Fi connection with the printer 100.

(Processes of Case A; FIGS. 3 to 6)

Next, the respective processes executed in T20 to T35 of Case A of FIG. 2 will be described with reference to FIGS. 3 to 6. The processes of T5 to T15 are similar to the processes of T20 to T30 except that the AP 6 is used instead of the printer 100, thus detailed description thereof will be omitted. In the following processes, each communication executed by the terminal 10 and the printer 100 is executed via the Wi-Fi I/Fs 16, 116. Due to this, the description "via the Wi-Fi I/F 16 (or 116)" will be omitted.

Figure 3:
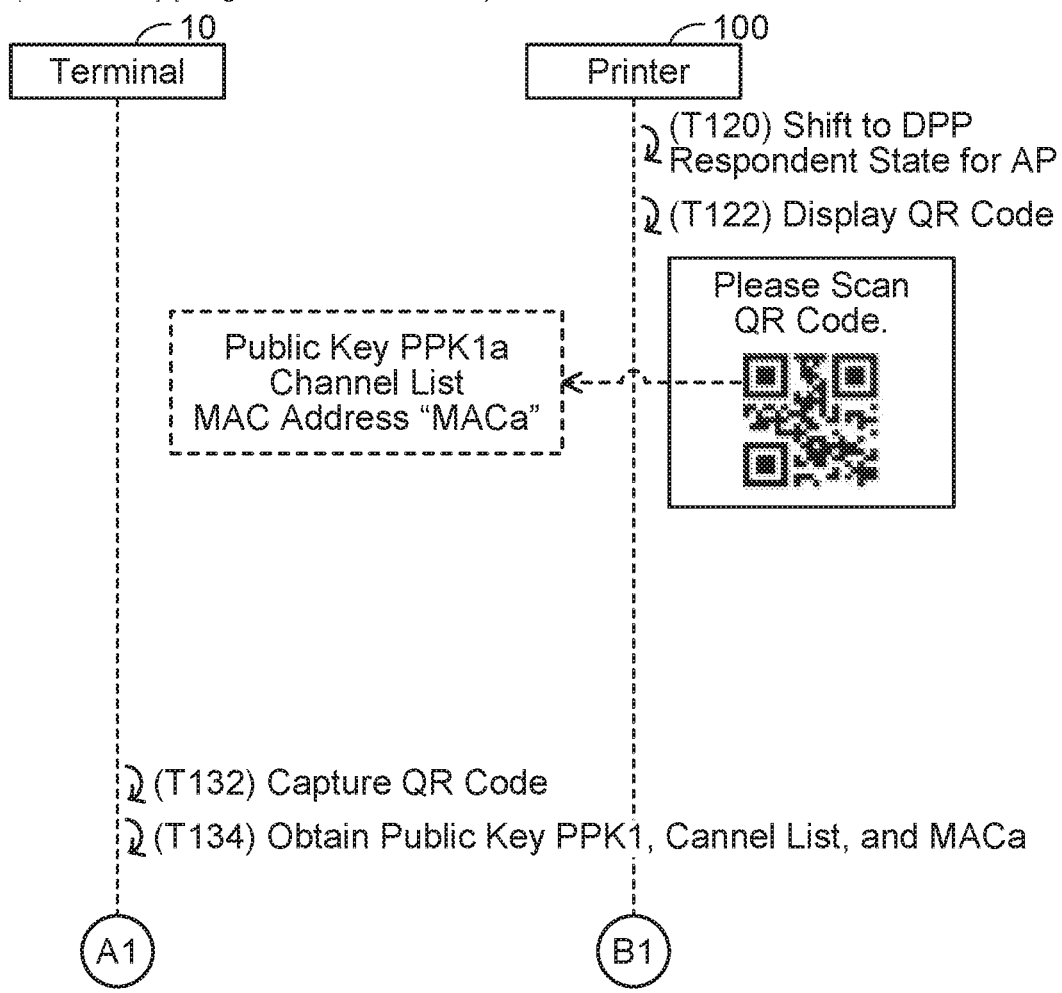
FIG. 3 shows a sequence diagram of a Bootstrapping process.

(Bootstrapping (BS) of T20; FIG. 3) Firstly, the process of the BS in T20 of FIG. 2 will be described with reference to FIG. 3. In T120, the printer 100 shifts from a non-respondent state to a DPP respondent state for AP. The non-respondent state is a state in which the Wi-Fi I/F 116 does not send a DPP Authentication Response (hereinbelow termed "ARes") (see T220 to be described later) even when a DPP Authentication Request (hereinbelow termed "AReq") (see T210 of FIG. 4 to be described later) is received from the terminal 10. The DPP respondent state for AP is a state in which the Wi-Fi I/F 116 sends the ARes to the terminal 10 in response to receiving the AReq including the MAC address "MACa" for establishing the Wi-Fi connection with the AP 6 as a destination MAC address from the terminal 10. That is, by shifting from the non-respondent state to the DPP respondent state for AP, the printer 100 enters a state capable of executing the Auth.

Next, the printer 100 causes the display unit 114 to display a QR code in T122. This QR code is a code image obtained by coding the public key PPK1$a$ stored in advance in the memory 134, a channel list stored in advance in the memory 134, and the MAC address "MACa". The channel list is a list of values of a plurality of communication channels to be used in the Auth. This QR code may be created by the printer 100 when the process of T122 is executed, or may be stored in advance in the memory 134 at a shipping of the printer 100. This point is similar to a QR code in T522 of FIG. 7 described later.

Following processes to be executed by the terminal 10 are realized by the app 40. In T132, the terminal 10 captures the QR code displayed on the printer 100 in T122 by using the camera 15. Further, in T134, the terminal 10 decodes the captured QR code and obtains the public key PPK1$a$, the channel list, and the MAC address "MACa". When the process of T130 is completed, the process of the BS of FIG. 2 is terminated.

Figure 4:
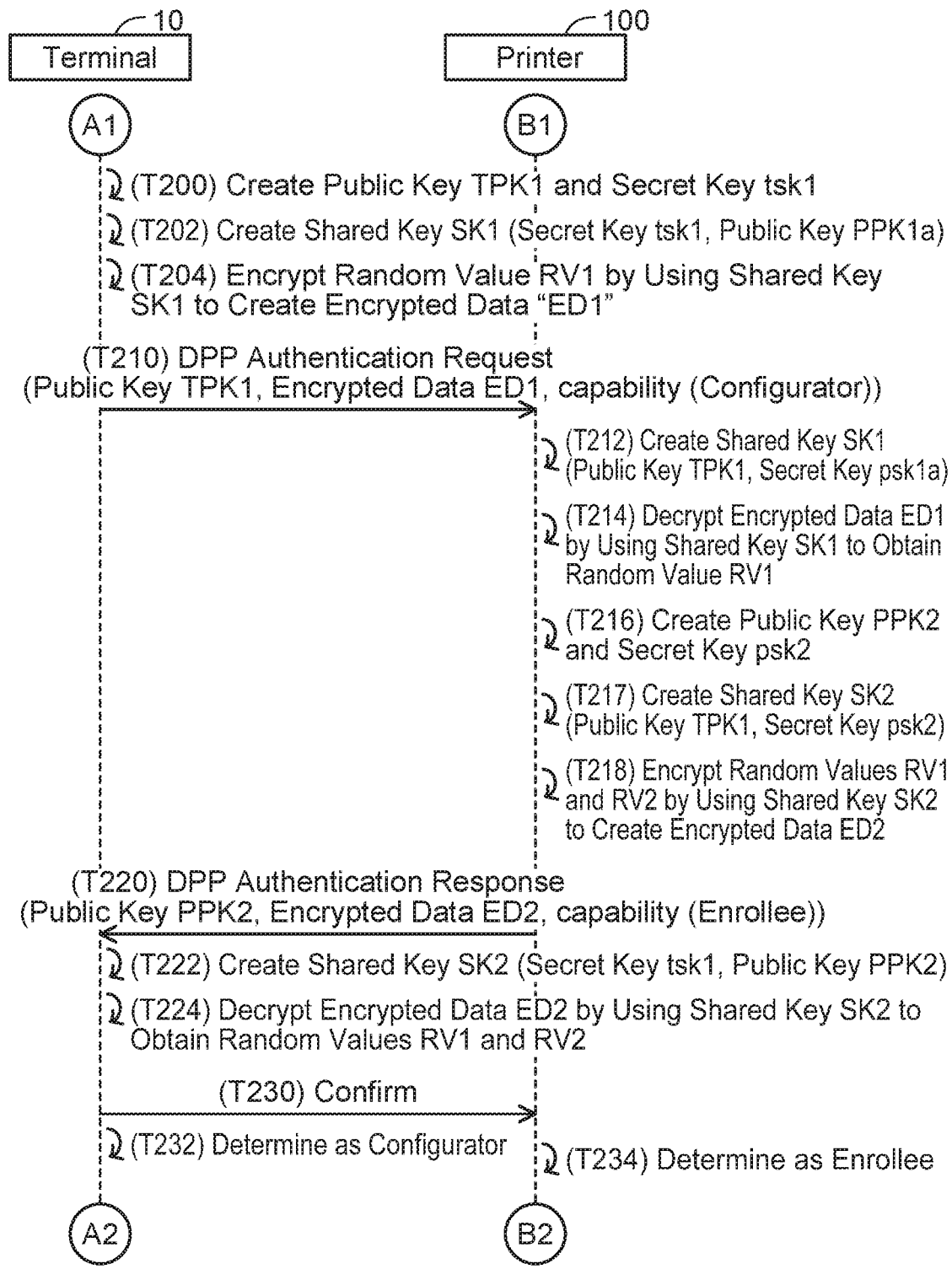
FIG. 4 shows a sequence diagram of an Authentication process.

(Authentication (Auth) of T25; FIG. 4) Next, the process of the Auth in T25 of FIG. 2 will be described with reference to FIG. 4. The terminal 10 creates a public key TPK1 and a secret key tsk1 of the terminal 10 in T200. Next, in T202, the terminal 10 creates a shared key SK1 according to Elliptic curve Diffie-Hellman key exchange (ECDH) by using the created secret key tsk1 and the public key PPK1$a$ of the printer 100 obtained in T134 of FIG. 3. Then, in T204, the terminal 10 creates encrypted data ED1 by using the created shared key SK1 to encrypt a random value RV1.

In T210, the terminal 10 sends an AReq to the printer 100 by setting the MAC address "MACa" obtained in T134 of FIG. 3 as its destination. The AReq is a signal for requesting the printer 100 to execute authentication. Here, the terminal 10 repeats sending the AReq to the printer 100 by sequentially using the plurality of communication channels in the channel list obtained in T134. The AReq includes the public key TPK1 of the terminal 10 created in T200, the encrypted data ED1 created in T204, and a capability of the terminal 10.

The capability includes any one of the following values: a value indicating that this device is capable of operating only as a Configurator according to the DPP scheme, a value indicating that this device is capable of operating only as an Enrollee according to the DPP scheme, and a value indicating that this device is capable of operating whichever one of the Configurator and the Enrollee. The Configurator refers to a device configured to send a CO to an Enrollee in the Config (T30 of FIG. 2). On the other hand, the Enrollee refers to a device that receives the CO from the Configurator in the Config. As above, in Case A of FIG. 2, the terminal 10 creates the first or second CO and sends them respectively to the AP 6 or the printer 100. As such, the capability of the terminal 10 includes the value indicating that it is capable of operating only as the Configurator.

The printer 100 receives the AReq from the terminal 10 in T210. As above, this AReq is sent with the MAC address "MACa" of the printer 100 as the destination. As such, the printer 100 can suitably receive this AReq from the terminal 10.

Further, when the printer 100 shifts to the DPP respondent state for AP in T120 of FIG. 3, it monitors receipt of the AReq using one communication channel among the plurality of communication channels in the channel list. As above, the AReq in T210 is sent by sequentially using the plurality of communication channels in the channel list. As such, the printer 100 can suitably receive this AReq from the terminal 10.

Next, the printer 100 executes following processes for authenticating the sender of the AReq (that is, the terminal 10). Specifically, firstly, in T212, the printer 100 creates a shared key SK1 according to the ECDH by using the public key TPK1 of the terminal 10 in the AReq and the secret key psk1a of the printer 100 stored in advance in the memory 134. Here, the shared key SK1 created by the terminal 10 in T202 and the shared key SK1 created by the printer 100 in T212 are identical to each other. Thus, the printer 100 can suitably decrypt the encrypted data ED1 in the AReq by using the created shared key SK1 in T204, as a result of which it can obtain the random value RV1. In a case where the decryption of the encrypted data ED1 succeeds, the printer 100 determines that the sender of the AReq is the device that captured the QR code displayed on the printer 100, that is, determines that the authentication succeeded, and executes subsequent processes from T216. On the other hand, in a case where the decryption of the encrypted data ED1 does not succeed, the printer 100 determines that the sender of the AReq is not the device that captured the QR code displayed on the printer 100, that is, determines that the authentication failed, and does not execute the subsequent processes from T216.

In T216, the printer 100 creates a new public key PPK2 and a new secret key psk2 of the printer 100. In a variant, the public key PPK2 and the secret key psk2 may be stored in advance in the memory 134. Next, in T217, the printer 100 creates a shared key SK2 according to the ECDH by using the public key TPK1 of the terminal 10 in the AReq of T210 and the created secret key psk2 of the printer 100. Then, in T218, the printer 100 creates encrypted data ED2 by using the created shared key SK2 to encrypt the obtained random value RV1 and a new random value RV2.

In T220, the printer 100 sends an ARes to the terminal 10. This ARes includes the public key PPK2 of the printer 100 created in T216, the encrypted data ED2 created in T218, and a capability of the printer 100. As described above, in Case A of FIG. 2, the printer 100 receives the second CO from the terminal 10. Accordingly, the capability of the printer 100 includes the value indicating that the printer 100 is capable of operating only as the Enrollee.

In response to receiving the ARes from the printer 100 in T220, the terminal 10 executes following processes for authenticating the sender of the ARes (that is, the printer 100). Specifically, firstly in T222, the terminal 10 creates a shared key SK2 according to the ECDH by using the secret key tsk1 of the terminal 10 created in T200 and the public key PPK2 of the printer 100 in the ARes. Here, the shared key SK2 created by the printer 100 in T217 and the shared key SK2 created by the terminal 10 in T222 are identical to each other. Thus, the terminal 10 can suitably decrypt the encrypted data ED2 in the ARes by using the created shared key SK2 in T224, as a result of which it can obtain the random values RV1 and RV2. In a case where the decryption of the encrypted data ED2 succeeds, the terminal 10 determines that the sender of the ARes is the device that displayed the captured QR code, that is, determines that the authentication succeeded, and executes subsequent processes from T230. On the other hand, in a case where the decryption of the encrypted data ED2 does not succeed, the terminal 10 determines that the sender of the ARes is not the device that displayed the captured QR code, that is, determines that the authentication failed, and does not execute the subsequent processes from T230.

In T230, the terminal 10 sends a Confirm to the printer 100. The Confirm includes information indicating that the terminal 10 operates as the Configurator and the printer 100 operates as the Enrollee. As a result, the terminal 10 determines to operate as the Configurator in T232, and the printer 100 determines to operate as the Enrollee in T234. When the process of T234 is completed, the process of FIG. 4 is terminated.

Figure 5:
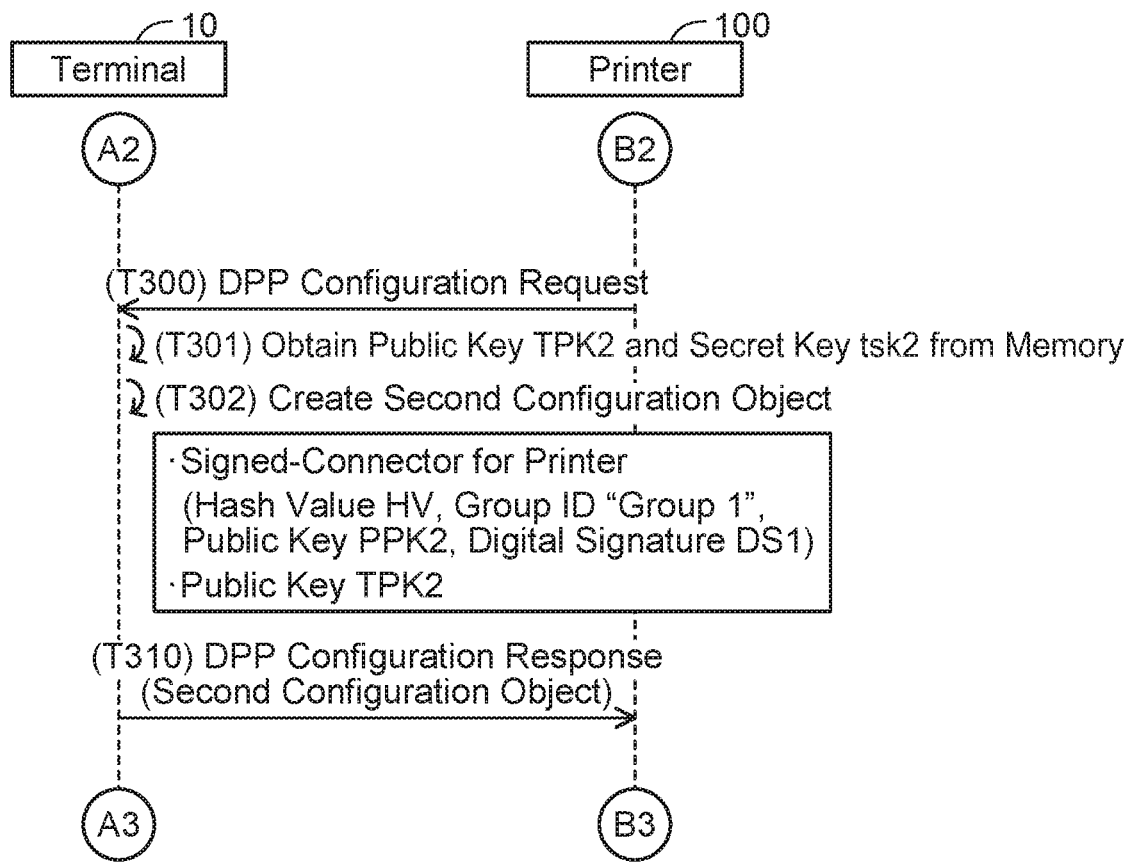
FIG. 5 shows a sequence diagram of a Configuration process.

(Configuration (Config) of T50; FIG. 5)

Next, the process of Config in T30 of FIG. 2 will be described with reference to FIG. 5. In T300, the printer 100 sends a DPP Configuration Request (hereinbelow termed simply as "CReq") to the terminal 10. This CReq is a signal requesting the CO to be sent.

The terminal 10 receives the CReq from the printer 100 in T300. In this case, the terminal 10 obtains a group ID "Group1", a public key TPK2, and a secret key tsk2 from a memory (not shown) of the terminal 10 in T301. As aforementioned, the terminal 10 have already executed the Config in T15 of FIG. 2 with the AP 6, and at that occasion the terminal 10 created the group ID "Group1", the public key TPK2, and the secret key tsk2 and stored the same in the memory. The group ID "Group1" is information for identifying a wireless network formed by the Wi-Fi connection being established between the printer 100 and the AP 6. In a variant, a character string designated by the user may be used as the group ID. That is, in T301, the terminal 10 obtains the respective information that were stored in T15 of FIG. 2. Next, in T302, the terminal 10 creates the second CO. Specifically, the terminal 10 executes following processes.

The terminal 10 creates a hash value HV by hashing the public key TPK2 of the terminal 10. Further, the terminal 10 creates a specific value by hashing a combination of the hash value HV, the group ID "Group1", and the public key PPK2 of the printer 100 in the ARes in T220 of FIG. 4. Then, the terminal 10 creates a digital signature DS1 by using the secret key tsk2 of the terminal 10 to encrypt the created specific value in accordance with an Elliptic Curve Digital Signature Algorithm (ECDSA). As a result, the terminal 10 can create a Signed-Connector for printer (hereinbelow, the Signed-Connector is termed simply as "SC") including the hash value HV, the group ID "Group1", the public key PPK2 of the printer 100, and the digital signature DS1. Further, the terminal 10 creates the second CO including the SC for printer and the public key TPK2 of the terminal 10.

In T310, the terminal 10 sends a DPP Configuration Response (hereinbelow termed simply as "CRes") including the second CO to the printer 100.

The printer 100 receives the CRes from the terminal 10 in T310. In this case, the printer 100 stores the second CO in the CRes in the memory 134. When the process of T310 is completed, the process of FIG. 5 is terminated.

Figure 6:
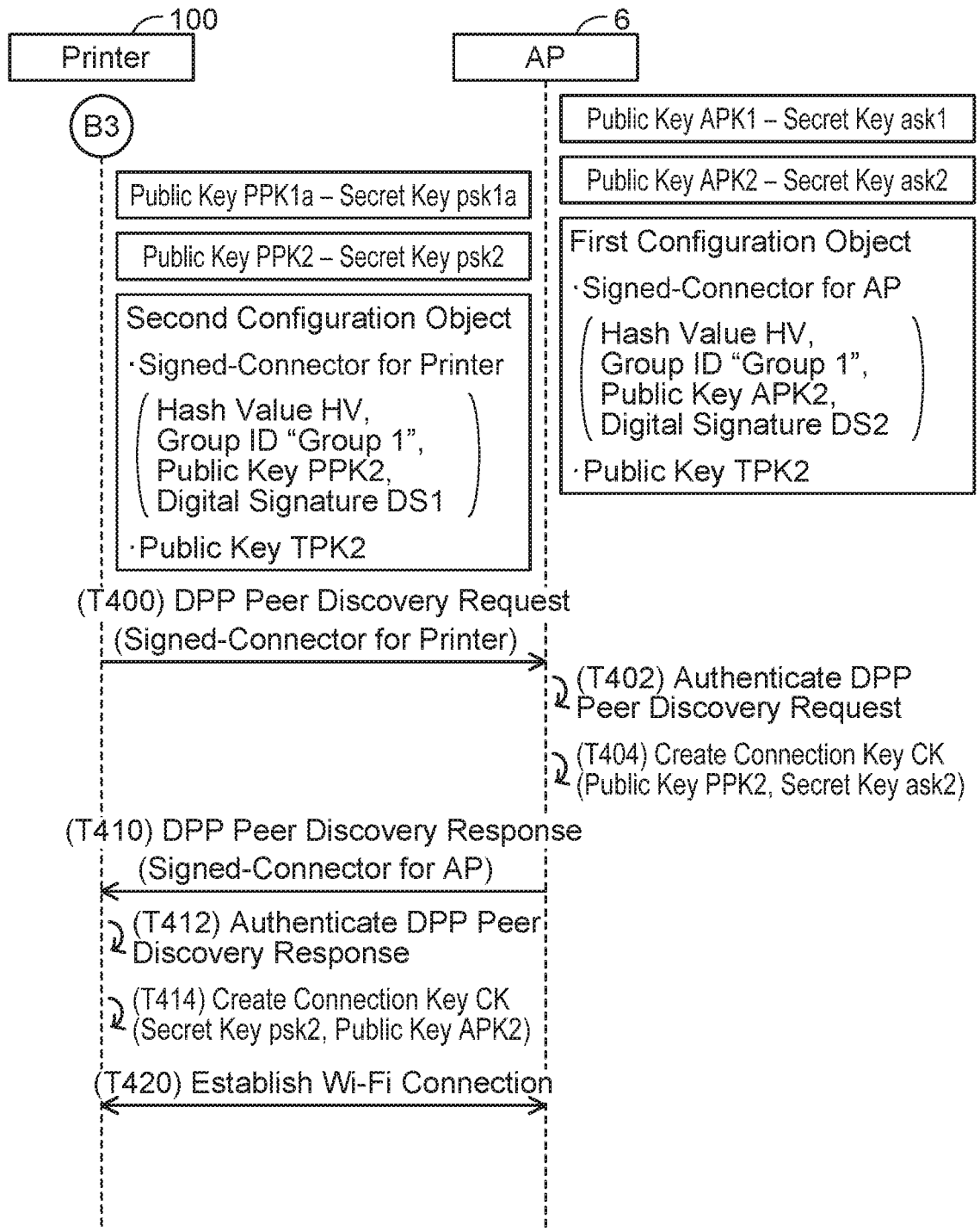
FIG. 6 shows a sequence diagram of a Network Access process.

(Network Access (NA) of T35; FIG. 6)

Next, the process of the NA in T35 of FIG. 2 executed between the printer 100 and the AP 6 will be described with reference to FIG. 6. As aforementioned, the processes of T5 to T15 of FIG. 2 have already been executed between the terminal 10 and the AP 6, similarly to T20 to T30 of FIG. 2. However, the AP 6 does not execute the processes of T120 and T122 of FIG. 3. The AP 6 stores in advance a public key APK1 and a secret key ask1 of the AP 6. Further, a QR code, which is obtained by coding the public key APK1 of the AP 6, a channel list of the AP 6, and a MAC address of the AP 6, is adhered to a housing of the AP 6. Processes similar to the processes from T134 are executed between the terminal 10 and the AP 6 when the terminal 10 captures this QR code. As a result, the AP 6 stores a public key APK2 and a secret key ask2 of the AP 6 (see T216 of FIG. 4), and further receives the first CO from the terminal 10 (see T310 of FIG. 5). The first CO includes a SC for AP and a public key TPK2 of the terminal 10. This public key TPK2 is identical to the public key TPK2 included in the second CO. Further, the SC for AP includes a hash value HV, a group ID "Group1", the public key APK2 of the AP 6, and a digital signature DS2. This hash value HV and this group ID "Group1" are respectively identical to the hash value HV and the group ID "Group1" included in the second CO. The digital signature DS2 is information in which a specific value, which is obtained by hashing a combination of the hash value HV, the group ID "Group1", and the public key APK2, is encrypted by the secret key tsk2 of the terminal 10, and is a value different from the digital signature DS1 included in the second CO.

In T400, the printer 100 sends a DPP Peer Discovery Request (hereinbelow termed simply as "DReq") including the SC for printer to the AP 6. This DReq is a signal requesting the AP 6 to execute authentication and send the SC for AP.

In response to receiving the DReq from the printer 100 in T400, the AP 6 executes a process for authenticating the sender of the DReq (that is, the printer 100) and the information in the DReq (that is, the hash value HV, the "Group1", and the public key PPK2). Specifically, in T402, the AP 6 firstly executes a first AP determination process that is regarding whether or not the hash value HV and the group ID "Group1" in the received SC for printer are respectively identical to the hash value HV and the group ID "Group1" in the SC for AP included in the stored first CO. In the case of FIG. 6, the AP 6 determines "identical" in the first AP determination process, thus it determines that the authentication of the sender of the DReq (that is, the printer 100) succeeds. Here, the fact that the hash value HV in the received SC for printer is identical to the hash value HV in the SC for AP included in the stored first CO means that the SC for printer and the SC for AP were created by the same device (that is, the terminal 10). As such, the AP 6 also determines that authentication of the creator of the received SC for printer (that is, the terminal 10) succeeds. Further, the AP 6 decrypts the digital signature DS1 in the received SC for printer by using the public key TPK2 of the terminal 10 included in the stored first CO. Since the decryption of the digital signature DS1 succeeds in the case of FIG. 6, the AP 6 executes a second AP determination process that is regarding whether or not a specific value obtained by decrypting the digital signature DS1 is identical to a value obtained by hashing the information in the received SC for printer (that is, the hash value HV, the "Group1", and the public key PPK2). In the case of FIG. 6, the AP 6 determines "identical" in the second AP determination process, thus it determines that the authentication of the information in the DReq succeeds, and executes processes from T404. The fact that the AP 6 determines "identical" in the second AP determination process means that the information in the received SC for printer (that is, the hash value HV, the "Group1", and the public key PPK2) has not been tampered by a third party since the second CO was stored in the printer 100. On the other hand, in a case where the AP 6 determines "not identical" in the first AP determination process, in a case where the decryption of the digital signature DS1 fails, or in a case where the AP 6 determines "not identical" in the second AP determination process, the AP 6 determines that the authentication failed and does not execute the processes from T404.

Next, in T404, the AP 6 creates a connection key CK (that is, a shared key) by using the obtained public key PPK2 of the printer 100 and the stored secret key ask2 of the AP 6 in accordance with the ECDH.

In T410, the AP 6 sends a DPP Peer Discovery Response (hereinbelow termed simply as "DRes") including the SC for AP to the printer 100.

In response to receiving the DRes from the AP 6 in T410, the printer 100 executes a process for authenticating the sender of the DRes (that is, the AP 6) and the information in the DRes (that is, the hash value HV, the "Group1", and the public key APK2). Specifically, in T412, the printer 100 firstly executes a first PR determination process that is regarding whether or not the hash value HV and the group ID "Group1" in the received SC for AP are respectively identical to the hash value HV and the group ID "Group1" in the SC for printer included in the stored second CO. In the case of FIG. 6, the printer 100 determines "identical" in the first PR determination process, thus it determines that the authentication of the sender of the DRes (that is, the AP 6) succeeds. The fact that the hash value HV in the received SC for AP is identical to the hash value HV in the SC for printer included in the stored second CO means that the SC for printer and the SC for AP were created by the same device (that is, the terminal 10). As such, the printer 100 also determines that authentication of the creator of the received SC for AP (that is, the terminal 10) succeeds. Further, the printer 100 decrypts the digital signature DS2 in the received SC for AP by using the public key TPK2 of the terminal 10 included in the stored second CO. Since the decryption of the digital signature DS2 succeeds in the case of FIG. 6, the printer 100 executes a second PR determination process that is regarding whether or not a specific value obtained by decrypting the digital signature DS2 is identical to a value obtained by hashing the information in the received SC for AP (that is, the hash value HV, the "Group1", and the public key APK2). In the case of FIG. 6, the printer 100 determines "identical" in the second PR determination process, thus it determines that the authentication of the information in the DRes succeeds, and executes processes from T414. The fact that the printer 100 determines "identical" in the second PR determination process means that the information in the SC for AP (that is, the hash value HV, the "Group1", and the public key APK2) has not been tampered by a third party since the first CO was stored in the AP 6. On the other hand, in a case where the printer 100 determines "not identical" in the first PR determination process, in a case where the decryption of the digital signature DS2 fails, or in a case where the printer 100 determines "not identical" in the second PR determination process, the printer 100 determines that the authentication failed and does not execute the processes from T414.

In T414, the printer 100 creates a connection key CK by using the stored secret key psk2 of the printer 100 and the public key APK2 of the AP 6 in the received SC for AP in accordance with the ECDH. Here, the connection key CK created by the AP 6 in T404 and the connection key CK created by the printer 100 in T414 are identical to each other. Due to this, the connection key CK for establishing the Wi-Fi connection is shared between the printer 100 and the AP 6.

After the connection key CK is shared between the printer 100 and the AP 6, the printer 100 and the AP 6 execute the 4way-handshake communication by using the connection key CK in T420. As a result, the Wi-Fi connection is established between the printer 100 and the AP 6. As aforementioned, the printer 100 receives the AReq in T210 of FIG. 4 from the terminal 10 by using one communication channel among the plurality of communication channels included in the channel list of the printer 100. That is, the printer 100 receives the AReq in T210 from the terminal 10 by using the communication channel which both the printer 100 and the terminal 10 can use. On the other hand, the channel used in the Wi-Fi connection of T420 is determined by the AP 6. In this embodiment, the communication channel by which the printer 100 receives the AReq from the terminal 10 in T210 of FIG. 4 is different from the communication channel by which the printer 100 establishes the Wi-Fi connection with the AP 6 in T420. However, in a variant, the former communication channel may be same as the latter communication channel.

Figure 7:
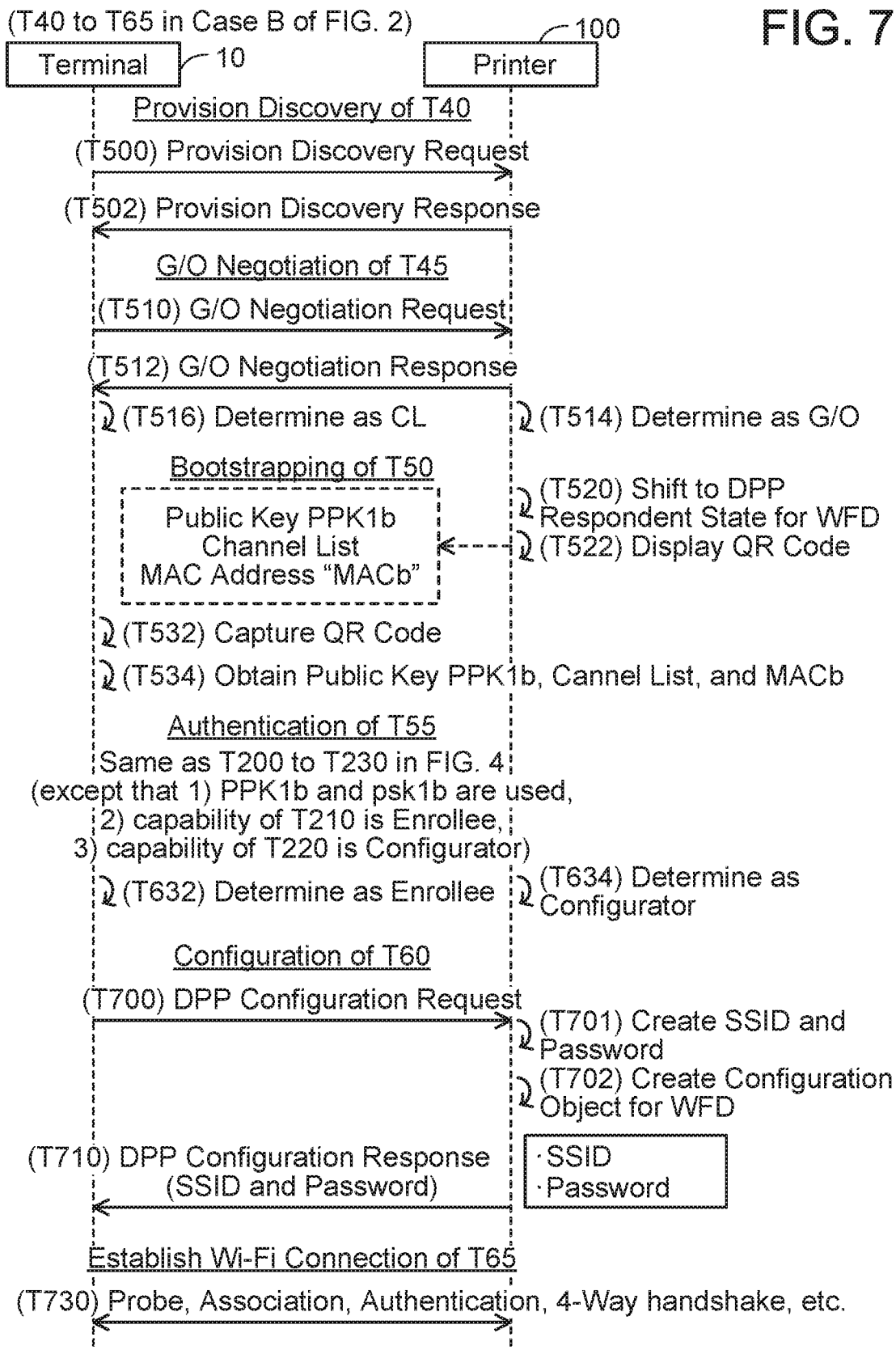
FIG. 7 shows a sequence diagram of Case B.

(Processes of Case B; FIG. 7)

Next, the respective processes executed in T40 to T65 of Case B of FIG. 2 will be described with reference to FIG. 7.

In the PD of T40 of FIG. 2, the terminal 10 sends a Provision Discovery Request (hereinbelow termed "PDReq") to the printer 100 in T500. The PDReq is a signal that requests to initiate communication according to the WFD scheme.

The printer 100 receives the PDReq from the terminal 10 in T500. In this case, the printer 100 sends a Provision Discovery Response (hereinbelow termed "PDRes") to the terminal 10 in T502.

In the GN of T45 of FIG. 2, the terminal 10 sends a G/O Negotiation Request (hereinbelow termed "GNReq") to the printer 100 in T510. The GNReq includes an Intent value of the terminal 10. The Intent value is a value indicating likeliness of becoming the G/O, and is predetermined to be in a predetermined range (such as from 1 to 15).

The printer 100 receives the GNReq from the terminal 10 in T510. In this case, the printer 100 sends a G/O Negotiation Response (hereinbelow termed "GNRes") to the terminal 10 in T512. The GNRes includes an Intent value of the printer 100.

Each of the terminal 10 and the printer 100 compares the Intent value of itself and the Intent value of the communication counterpart, determines that the device with the larger Intent value becomes the G/O (i.e., parent station), and determines that the device with the smaller Intent value becomes the CL (i.e., child station). In the case of FIG. 7, the printer 100 determines to become the G/O in T514 and the terminal 10 determines to become the CL in T516.

In the BS of T50 of FIG. 2, the printer 100 shifts from the non-respondent state to a DPP respondent state for WFD in T520. The DPP respondent state for WFD is a state in which the Wi-Fi I/F 116 sends the ARes to the terminal 10 in response to receiving the AReq including the MAC address "MACb" for establishing the Wi-Fi connection with the terminal 10 as a destination MAC address from the terminal 10. That is, by shifting from the non-respondent state to the DPP respondent state for WFD, the printer 100 enters the state capable of executing the Auth.

Next, in T522, the printer 100 causes the display unit 114 to display a QR code. This QR code is a code image obtained by coding the public key PPK1*b*, the channel list, and the MAC address "MACb". That is, the QR code differs from the QR code displayed in T122 of FIG. 3.

T532 and T534 are similar to T132 and T134 of FIG. 3 except that the public key PPK1*b* and the MAC address "MACb" are obtained in T534.

Processes similar to T200 to T230 of FIG. 4 are executed in the Auth of T55 of FIG. 2. However, there are some differences, which will be described below. In T202, the terminal 10 uses the public key PPK1*b* obtained in T534 instead of the public key PPK1*a*. In T210, the terminal 10 sends the AReq including the MAC address "MACb" obtained in T534 as the destination address instead of the MAC address "MACa" to the printer 100. Further, the device determined to become the G/O in the GN (which is the printer 100 in the case of FIG. 7) becomes the Configurator and the device determined to become the CL in the GN (which is the terminal 10 in the case of FIG. 7) becomes the Enrollee. Due to this, the capability of the terminal 10 in the AReq of T210 indicates that it is capable of operating only as the Enrollee and not as the Configurator.

In T212, the printer 100 uses the secret key psk1*b* instead of the secret key psk1*a*. Further, the capability in the ARes of T220 indicates that the printer 100 is capable of operating only as the Configurator and not as the Enrollee.

When the processes similar to T200 to T230 of FIG. 4 are executed, the terminal 10 determines to become the Enrollee in T632. Further, the printer 100 determines to become the Configurator in T634.

The following is executed in the Config of T60 of FIG. 2. As aforementioned, in the present case, the terminal 10 becomes the Enrollee (T632) and the printer 100 becomes the Configurator (T634). Due to this, the terminal 10 being the Enrollee sends the CReq to the printer 100 in T700.

The printer 100 receives the CReq from the terminal 10 in T700. In this case, the printer 100 creates a Service Set Identifier (SSID) being an identifier of a wireless network in which the printer 100 operates as the G/O and a password to be used in the wireless network in T701. Then, in T702, the printer 100 creates the CO including the SSID and the password created in T701 instead of the CO including the SC. Then, the printer 100 sends the created CO to the terminal 10 in T710.

The terminal 10 receives the CO from the printer 100 in T710. Due to this, the terminal 10 can establish the Wi-Fi connection with the printer 100 by using the SSID and the password included in the CO.

In the establishment of the Wi-Fi connection in T65 of FIG. 2, the respective types of communication being the Probe, the Association, the Authentication, the 4-Way Handshake and the like are executed between the terminal 10 and the printer 100 as indicated in T730. In the course of the communication as above, communication of the SSID and the password is executed and the printer 100 being the G/O executes password authentication. When this authentication succeeds, the Wi-Fi connection is established between the terminal 10 and the printer 100. As described also in connection to Case A as above, the printer 100 uses one communication channel among the plurality of communication channels included in the channel list of the printer 100 to receive the AReq from the terminal 10. On the other hand, the channel used in the Wi-Fi connection of T730 is determined by the G/O. In the present case, since the printer 100 becomes the G/O (T554), the printer 100 uses the same channel that was used in receiving the AReq to establish the Wi-Fi connection with the terminal 10 in T730. That is, in the present embodiment, the communication channel by which the printer 100 receives the AReq from the terminal 10 in T55 and the communication channel by which the printer 100 establishes the Wi-Fi connection with the terminal 10 in T730 are same. However, in a variant, the communication channel of the former and the communication channel of the latter may be different.

Figure 8:
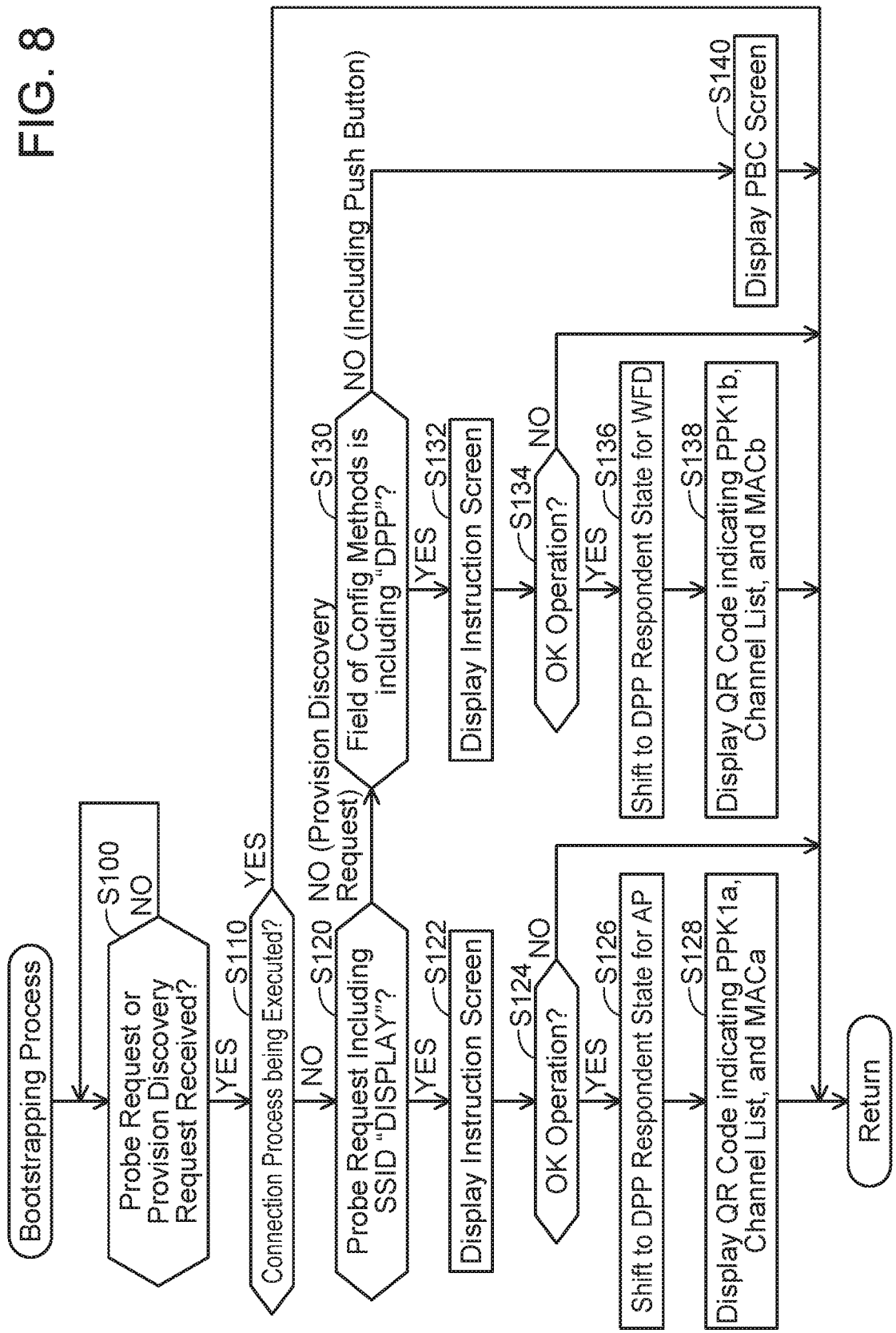
FIG. 8 shows a sequence diagram of a Bootstrapping process.

(Details of Bootstrapping Process of Printer 100; FIG. 8)

Next, the BS process executed by the CPU 132 of the printer 100 will be described with reference to FIG. 8. The process of FIG. 8 is initiated when power of the printer 100 is turned ON.

In S100, the CPU 132 monitors receipt of a Probe Request (hereinbelow termed "PRReq") or a PDReq from a terminal (such as 10) via the Wi-Fi I/F 116. The CPU 132 proceeds to S110 in a case of receiving the PRReq or the PDReq from the terminal (YES to S100).

In S110, the CPU 132 determines whether a process for establishing a Wi-Fi connection with a device that is different from the terminal being a sender of the signal received in S100 (i.e., processes from S120 of FIG. 8 and the processes of FIGS. 3 to 7) are being executed. The CPU 132 returns to S100 without executing the processes from S120 in a case of determining that such processes are being executed (YES to S110). As above, in the case where the processes for establishing the Wi-Fi connection with a particular device are being executed due to the processes of S120 to S140 having been executed, the processes of S120 to S140 are not executed even if the PRReq or the PDReq is received from another device (YES to S100) while the Wi-Fi connection is established. Due to this, the process for establishing the Wi-Fi connection with the particular device can be suppressed from being interrupted by another process, as a result of which the printer 100 can suitably establish the Wi-Fi connection with the particular device as above. On the other hand, in a case of determining that the processes for establishing the Wi-Fi connection are not being executed (NO to S110), the CPU 132 proceeds to S120.

In S120, the CPU 132 determines whether the signal received in S100 is the PRReq including a SSID "DISPLAY". The CPU 132 proceeds to S122 in a case of determining that the received signal is such a PRReq (YES to S120). On the other hand, in a case of determining that the received signal is the PDReq (NO to S120), the CPU 132 proceeds to S130.

In S122, the CPU 132 displays an instruction screen. The instruction screen is a screen for the user to instruct whether to display the QR code, and includes an OK button and a CANCEL button.

In S124, the CPU 132 determines whether the OK button in the instruction screen displayed in S122 has been selected. The CPU 132 proceeds to S126 in a case of determining that the OK button has been selected (YES to S124) and returns to the process of S100 without executing S126 and S128 in a case of determining that the CANCEL button has been selected (NO to S124). As above, in the present embodiment, shifting to the DPP respondent state for AP (S126) and displaying of the QR code (S128) are executed in the case where the instruction screen is displayed and the OK button is selected. On the other hand, in the case where the CANCEL button is selected, these processes are not executed. Due to this, the printer 100 can switch whether or not to display the QR code according to an intention of the user.

In S126, the CPU 132 instructs the Wi-Fi I/F 116 to shift to the DPP respondent state for AP. Due to this, the CPU 132 enters a state of standby for receipt of the AReq including the MAC address "MACa" as the destination MAC address.

In S128, the CPU 132 displays the QR code obtained by coding the public key PPK1a, the channel list, and the MAC address "MACa". When S128 is completed, the process of FIG. 8 is terminated.

Further, in S130, the CPU 132 checks information described in a field of a Config Methods (hereinbelow termed "CM") included in the PDReq. Then, the CPU 132 determines whether the CM includes a letter string "DPP" or a letter string "Push Button". Here, the CM including the letter string "DPP" means that the sender terminal of the PDReq is requesting to establish the Wi-Fi connection according to the WFD scheme by executing communication according to the DPP scheme. Further, the CM including the letter string "Push Button" means that the sender terminal of the PDReq is requesting to establish the Wi-Fi connection according to the WFD scheme without using the DPP scheme. The CPU 132 proceeds to S132 in a case of determining that the CM includes the letter string "DPP" (YES to S130) and proceeds to S140 in a case of determining that the CM includes the letter string "Push Button" (NO to S130).

S132, S134, and effects achieved by these processes are similar to those of S122 and S124. In S136, the CPU 132 instructs the Wi-Fi I/F 116 to shift to the DPP respondent state for WFD. Due to this, the CPU 132 enters a state of standby for receipt of the AReq including the MAC address "MACb" as the destination MAC address.

In S138, the CPU 132 displays the QR code obtained by coding the public key PPK1b, the channel list, and the MAC address "MACb". When the process of S138 is completed, the process of FIG. 8 is terminated.

Further, in a case of determining NO to S130, the processes of S132 to S138 are not executed and S140 is executed. In S140 the CPU 132 displays a PBC screen according to a Push Button Configuration (PBC) of a Wi-Fi Protected Setup (WPS). The PBC screen includes a button that is a trigger for establishing the Wi-Fi connection according to the WFD scheme.

(Details of Case A; FIG. 9)

Next, specific cases realized by the process of FIG. 8 (as well as the processes of FIGS. 3 to 7) will be described with reference to FIGS. 9 to 11. Firstly, Case A of FIG. 2 (i.e., Case A of FIGS. 3 to 6) will be described with reference to FIG. 9.

In response to accepting an operation to activate the app 40 from the user in T800, the terminal 10 displays a selection screen in T802. The selection screen includes a button B1 for establishing the Wi-Fi connection between the printer 100 and the AP 6 and a button B2 for establishing the Wi-Fi connection between the printer 100 and the terminal 10. For example, in a case where the terminal 10 has the Wi-Fi connection established with the AP 6, the user selects the button B. In response to accepting the selection of the button B1 in T804, the terminal 10 sends the PRReq including the SSID "DISPLAY" to the printer 100 in T810.

When the PRReq is received from the terminal 10 in T810 (YES to S100 of FIG. 8), the printer 100 displays an instruction screen in T812 (NO to S110, YES to S120, and S122). The instruction screen includes an OK button B3 and a CANCEL button B4. In response to accepting selection of the OK button B3 from the user in T814 (YES to S124), the printer 100 shifts to the DPP respondent state for AP in T820 (S126), and displays the QR code in T822 (S128). Processes of T820 and T822 correspond to the processes of T120 and T122 of FIG. 3.

T824 and T826 are similar to T132 and T134 of FIG. 3. The Auth of T830 is similar to the Auth of FIG. 4. When the process of the Auth of T830 is completed, the printer 100 stops displaying the QR code in T835.

Here, when operations similar to T800 to T804 are executed in the terminal 30 that is different from the terminal 10, the printer 100 receives the PRReq including the SSID "DISPLAY" from the terminal 30 in T837 (YES to S100). In this case, since the printer 100 is executing the process for establishing the Wi-Fi connection with the terminal 10 (YES to S110), it does not display the QR code.

The Config of T840 and the NA of T850 are similar to the Config of FIG. 5 and the NA of FIG. 6. Due to this, the printer 100 establishes the Wi-Fi connection with the AP 6. For example, in the case where the terminal 10 has the Wi-Fi connection established with the AP 6, the printer 100 can establish the same Wi-Fi connection with the AP 6. Due to this, the printer 100 can receive image data representing a print target image from the terminal 10 via the AP 6 and execute print of this image.

When the NA of T850 is completed, the printer 100 shifts from the DPP respondent state for AP to the non-respondent state in T860. Although not shown, the printer 100 shifts from the DPP respondent state for AP to the non-respondent state also in a case of not receiving the AReq even when a predetermined time has elapsed since when it had shifted to the DPP respondent state for AP in T820.

(Details of Case B; FIG. 10)

Next, details of Case B of FIG. 2 (i.e., Case B of FIG. 7) will be described with reference to FIG. 10. T900 and T902 are similar to T800 and T802 of FIG. 9.

For example, in a case where the terminal 10 does not have the Wi-Fi connection established with the AP 6, the user selects the button B2. In this case, in response to accepting selection of the button B2 in T904, the terminal 10 sends the PDReq including the CM in which the letter string "DPP" is described to the printer 100 in T910.

When the PDReq is received from the printer 100 in T910 (YES to S100 of FIG. 8), the printer 100 sends the PDRes to the terminal 10 in T912. Processes of T910 and T912 correspond to the processes of T500 and T502 of FIG. 7. The GN of T914 is similar to T510 to T516 of FIG. 7.

Next, in T916, the printer 100 displays the instruction screen (NO to S110, NO to S120, YES to S130, and S132). When selection of the OK button B3 is accepted from the user in T918 (YES to S134), the printer 100 shifts to the DPP respondent state for WFD in T920 (S136) and displays the QR code in T922 (S138). Processes of T920 and T922 correspond to the processes of T520 and T522 of FIG. 7.

T924 and T926 are similar to T532 and T534 of FIG. 7. The Auth of T930 is similar to the Auth of FIG. 7. When the process of the Auth of T930 is completed, the printer 100 stops displaying the QR code in T935.

Here, when operations similar to T900 to T904 are executed in the terminal 30 that is different from the terminal 10, the printer 100 receives the PDReq including the CM in which the letter string "DPP" is described from the terminal 30 in T937 (YES to S100). In this case, since the printer 100 is executing the process for establishing the Wi-Fi connection with the terminal 10 (YES to S110), it does not display the QR code.

The Config of T940 and the establishment of the Wi-Fi connection of T950 are similar to the Config in T700 to T710 of FIG. 7 and the establishment of the Wi-Fi connection of T730 of FIG. 7. Due to this, the printer 100 can establish the Wi-Fi connection with the terminal 10. Due to this, the printer 100 can receive the image data representing the print target image from the terminal 10 without intervention of the AP 6 and execute print of this image.

When the process of establishing the Wi-Fi connection in T950 is completed, the printer 100 shifts from the DPP respondent state for WFD to the non-respondent state in T960. Although not shown, the printer 100 shifts from the DPP respondent state for WFD to the non-respondent state also in a case of not receiving the AReq even when a predetermined time has elapsed since when it had shifted to the DPP respondent state for WFD in T920. As above, since the printer 100 shifts to the non-respondent state, the printer 100 does not need to execute the process of standby for the receipt of the AReq, and a processing load on the printer 100 may be reduced.

(Details of Case C; FIG. 11)

Next, details of Case C different from Case A and Case B will be described with reference to FIG. 11. In Case C, the terminal 20 not supporting the DPP scheme is used instead of the terminal 10.

The terminal 20 comprises an app for establishing the Wi-Fi connection with the printer 100. This app is a program different from the app 40 of the terminal 10, and is a program for establishing the Wi-Fi connection according to the WFD scheme without using the DPP scheme. In response to accepting an operation for activating this app from the user in T1000, the terminal 20 displays an inquiry screen in T1002. The inquiry screen includes a message asking the user whether to establish the Wi-Fi connection between the printer 100 and the terminal 10 and an OK button B5. In response to accepting selection of the button B5 in T1004, the terminal 20 sends the PDReq including the CM in which the letter string "Push Button" is described to the printer 100 in T1010.

When the PDReq is received from the printer 100 in T1010 (YES to S100 of FIG. 8), the printer 100 sends the PDRes to the terminal 20 in T1012. The GN of T1014 is similar to T510 to T516 of FIG. 7. That is, in Case C as well, the printer 100 is determined to be the G/O (T514 of FIG. 7).

Next, in T1020, the printer 100 displays the PBC screen (NO to S110, NO to S120, NO to S130, and S140). The PBC screen includes a message indicating to establish the Wi-Fi connection with the terminal 10 and a connection button B6. When selection of the button B6 is accepted from the user in T1022, the printer 100 executes the WPS with the terminal 20 in T1030. In the course of the WPS, the printer 100 being the G/O creates a SSID and a password, and sends such information to the terminal 20.

Establishment of the Wi-Fi connection in T1050 is similar to the establishment of the Wi-Fi connection in T730 of FIG. 7. Due to this, the printer 100 can establish the Wi-Fi connection with the terminal 20. Due to this, the printer 100 can receive the image data representing the print target image from the terminal 20 without intervention of the AP 6 and execute print of this image.

Effects of Present Embodiment

In the case of receiving the PDReq including the CM in which the letter string "DPP" is described from the terminal 10 (T910 of FIG. 10), the printer 100 shifts to the DPP respondent state for WFD (T920) and displays the QR code obtained by coding the public key PPK1*b* and the like (T922). Due to this, the public key PPK1*b* and the like are obtained by the terminal 10 (T926). The printer 100 can send the ARes to the terminal 10 in the case of receiving the AReq in which the public key PPK1*b* is used from the terminal 10 (T930). Due to this, the printer 100 can establish the Wi-Fi connection with the terminal 10 (T950). As above, the Wi-Fi connection can be established between the printer 100 and the terminal 10 by using this novel scheme.

For example, a user who is knowledgeable about operations on the printer 100 can cause the printer 100 to execute the display of the QR code and the shift to the DPP respondent state for WFD by performing predetermined operations on the printer 100 (such as an operation in a setting screen). However, a user who has no knowledge of such might not be able to suitably perform the predetermined operations. According to the present embodiment, the printer 100 executes the display of the QR code and the shift to the DPP respondent state for WFD in the case of receiving the PDReq from the terminal 10 even if the predetermined operations as above are not performed. Due to this, the user can easily cause the printer 100 to display the QR code and shift to the DPP respondent state for WFD by using the app 40 of the terminal 10.

Further, in the case of receiving the PRReq different from the PDReq from the terminal 10 (T810 of FIG. 9), the printer 100 shifts to the DPP respondent state for AP (T820) and displays the QR code obtained by coding the public key PPK1*a* and the like (T822). Due to this, the public key PPK1*a* and the like are obtained by the terminal 10 (T826). The printer 100 can send the ARes to the terminal 10 in the case of receiving the AReq in which the public key PPK1*a* is used from the terminal 10 (T830). Due to this, the printer 100 can establish the Wi-Fi connection with the terminal 10 (T850). As above, the printer 100 can establish the Wi-Fi connection with a suitable device (i.e., the terminal 10 or the AP 6) in response to receiving which one of the PDReq and the PRReq is received from the terminal 10, that is, in response to the request from the terminal 10.

Further, in Case B of FIG. 10, the printer 100 shifts to the state of standby for the receipt of the AReq including the MAC address "MACb" as the destination MAC address in T920, and displays the QR code in which the MAC address "MACb" is coded in T922. In this case, the printer 100 does not send the ARes even if the AReq including the MAC address "MACa", which is different from the MAC address "MACb", as the destination MAC address is received. That is, since the printer 100 does not execute the process for establishing the Wi-Fi connection with the AP 6, the printer 100 can suitably establish the Wi-Fi connection with the terminal 10. On the other hand, in Case A of FIG. 9, the printer 100 shifts to the state of standby for the receipt of the AReq including the MAC address "MACa" as the destination MAC address in T820, and displays the QR code in which the MAC address "MACa" is coded in T822. In this case, the printer 100 does not send the ARes even if the AReq including the MAC address "MACb", which is different from the MAC address "MACa", as the destination MAC address is received. That is, since the printer 100 does not execute the process for establishing the Wi-Fi connection with the terminal 10, the printer 100 can suitably establish the Wi-Fi connection with the AP 6.

Further, the printer 100 does not shift to the DPP respondent state for WFD and does not display the QR code in the case of receiving the PDReq including the CM in which the letter string "Push Button" is described (T1010 of FIG. 11) from the terminal 20. Due to this, the printer 100 can suitably establish the Wi-Fi connection with the terminal 20 without using the DPP scheme (T1050). Especially in the present embodiment, a situation is assumed in which the printer 100 receives the PDReqs, being a same type of signals, from the terminal 10 and the terminal 20. Further, the printer 100 switches between shifting to the DPP respondent state for WFD and displaying the QR code (T920 and T922 of FIG. 10) and displaying the PBC screen (T1020 of FIG. 11) depending on the information described in the CM included in the PDReq. Due to this, the printer 100 can use a suitable scheme for each of the terminal 10 and the terminal 20 to establish the Wi-Fi connection with the terminal 10 or the terminal 20.

(Corresponding Relationship)

The printer 100 is an example of a "communication device". The terminal 10 is an example of a "first external device" and a "second external device". The terminal 20 and the terminal 30 are respectively an example of a "third external device" and a "fourth external device". The display unit 114 and the Wi-Fi I/F 116 are respectively an example of an "output unit" and a "wireless interface". The channels in the channel list are examples of a "predetermined communication channel". The PDReq including the CM in which the letter string "DPP" is described, the PRReq including the SSID "DISPLAY", and the PDReq including the CM in which the letter string "Push Button" is described are respectively an example of a "first specific signal", a "second specific signal", and a "third specific signal". The letter string "DPP" and the letter string "Push Button" are respectively an example of "first predetermined information" and "second predetermined information". The DPP respondent state for WFD, the QR code, the public key PPK1*b*, the MAC address "MACb", the AReq, the ARes, and the Wi-Fi connection in Case B of FIG. 10 are respectively an example of a "first respondent state", "first specific information", a "first public key", a "first MAC address", a "first authentication request", a "first authentication response", and a "first wireless connection". The DPP respondent state for AP, the QR code, the public key PPK1*a*, the MAC address "MACa", the AReq, the ARes, and the Wi-Fi connection in Case A of FIG. 9 are respectively an example of a "second respondent state", "second specific information", a "second public key", a "second MAC address", a "second authentication request", a "second authentication response", and a "second wireless connection". The Wi-Fi connection in Case C of FIG. 11 is an example of a "third wireless connection". The predetermined time elapsing since when the QR code was displayed in T922 of FIG. 10 is an example of a "specific condition".

T910, T916, T920, T922, and T950 of FIG. 10 are respectively an example of "receive a first specific signal", "cause the output unit which is the display unit to display an instruction screen", "shift an operation state of the communication device from a non-respondent state to a first respondent state", "cause the output unit to output first specific information", and "establish a first wireless connection". T210 of FIG. 4 referenced in T930 and T220 of FIG. 4 referenced in T930 are respectively an example of "receive a first authentication request" and "send a first authentication response". The process of shifting to the non-respondent state similar to T960 in the case where the predetermined time has elapsed since the QR code was displayed in T922 is an example of "shift the operation state of the communication device from the first respondent state to the non-respondent state in a case where a specific condition is satisfied after the operation state of the communication device has been shifted to the first respondent state". T634 of FIG. 7 is an example of "cause the communication device to operate as a Configurator". T810, T820, T822, and T850 of FIG. 9 are respectively an example of "receive a second specific signal", "shift the operation state of the communication device from the non-respondent state to a second respondent state", "cause the output unit to output second specific information", and "establish a second wireless connection". T210 of FIG. 4 referenced in T830 and T220 of FIG. 4 referenced in T830 are respectively an example of "receive a second authentication request" and "send a second authentication response". T1010 and T1050 of FIG. 11 are respectively and example of "receive a third specific signal" and "establish a third wireless connection".

(Variant 1) The "first specific signal" may not be the PDReq but may be the GNReq, or may be another signal according to the WFD scheme.

(Variant 2) In S100 of FIG. 8, the receipt of the PRReq may not be monitored. In this case, S120 to S128 may be omitted. That is, Case A of FIG. 9 may not be realized. In general terms, "receive a second specific signal", "cause the output unit to output second specific information", "shift the operation state of the communication device from the non-respondent state to a second respondent state", "receive a second authentication request", "send a second authentication response" and "establish a second wireless connection" may be omitted.

(Variant 3) The printer 100 may not use two different public keys PPK1a, PPK1b, but may use only one public key. That is, the public key indicated by the QR code displayed in T822 of FIG. 9 and the public key indicated by the QR code displayed in T922 of FIG. 10 may be same. In general terms, the "second public key" may be different from the first public key as in the above embodiment, or may be same as the first public key as in this variant.

(Variant 4) For example, the QR code displayed in T922 of FIG. 10 may not be constituted by coding the channel list and the MAC address. That is, the QR code only needs to be a coded image in which at least the public key is coded. In general terms, the "first specific information" simply needs to be information obtained by using at least the public key, and may not be information obtained by using the first MAC address. Similarly, the "second specific information" simply needs to be information obtained by using at least the public key, and may not be information obtained by using the second MAC address.

(Variant 5) The Wi-Fi I/F 116 may be assigned with only one MAC address. That is, the MAC address indicated by the QR code displayed in T822 of FIG. 9 may be same as the MAC address indicated by the QR code displayed in T922 of FIG. 10. In general terms, the "wireless interface" may not be assigned with the second MAC address different from the first MAC address.

(Variant 6) In S100 of FIG. 8, the receipt of the PDReq including the CM in which the letter string "Push Button" is described may not be monitored. In this case, S140 may be omitted. That is, Case C of FIG. 11 may not be realized. In general terms, "receive a third specific signal" and "establish a third wireless connection" may be omitted.

(Variant 7) S110 of FIG. 8 may not be executed. In general terms, the first specific information may be outputted in a case where the first specific signal is received from the fourth external device.

(Variant 8) S122, S124, S132, and S134 of FIG. 8 may not be executed. That is, "cause the output unit which is the display unit to display an instruction screen" may be omitted.

(Variant 9) The printer 100 may determine to become the CL in the GN of FIG. 7. In this case, the printer 100 determines to become the Enrollee instead of T634. That is, "cause the communication device to operate as a Configurator" may be omitted.

(Variant 10) In T810 of FIG. 9, the terminal 10 may send a Service Discovery Request of the WFD scheme instead of the PRReq to the printer 100. This Request includes information for inquiring whether the printer 100 is capable of displaying the QR code. In this variant, the Service Discovery Request is an example of the "second specific signal".

(Variant 11) In T822 of FIG. 9 and T922 of FIG. 10, the printer 100 may cause the print executing unit 118 to print the QR code on a print medium instead of displaying the QR code on the display unit 114. According to this variant, for example, communication according to the DPP scheme may be executed to establish the Wi-Fi connection between the printer 100 and the AP 6 or the terminal 10 even in a situation in which the printer 100 is not provided with the display unit 114. In this variant, the print executing unit 118 is an example of the "output unit". In another variant, the printer 100 may be provided with a wireless interface (such as Near Field Communication (NFC) I/F or a Bluetooth (registered trademark) I/F) that is different from the Wi-Fi I/F 116. In this case, the printer 100 may send the public key, the channel list, and the MAC address to the terminal 10 via this different wireless interface in T822 of FIG. 9 and/or T922 of FIG. 10. In this variant, this different wireless interface is an example of the "output unit". Further in this variant, the "first specific information" may not be the "coded image".

(Variant 12) In the case of receiving the PDReq or the PRReq in S100 of FIG. 8, the printer 100 may calculate a receiving radio wave intensity of this signal, and may execute the processes from S110 in a case where the calculated receiving radio wave intensity is equal to or greater than a preset threshold.

(Variant 13) The printer 100 may display, instead of the QR code, an image including a shared code, key, phrase, and word obtained by coding the public key, the channel list, and the MAC address on the display unit 114.

(Variant 14) In the case where the predetermined time has elapsed since when the printer 100 has shifted to the DPP respondent state for WFD, the printer 100 may not shift to the non-respondent state. That is, "shift the operation state of the communication device from the first respondent state to the non-respondent state in a case where a specific condition is satisfied after the operation state of the communication device has been shifted to the first respondent state" may be omitted. Further, in another variant, the printer 100 may monitor acceptance of an instruction from the user to shift to the non-respondent state instead of monitoring the lapse of the predetermined time. In this variant, the acceptance of the instruction from the user is an example of the "specific condition".

(Variant 15) When the PDReq is sent in T910 of FIG. 10, there is a possibility that the QR code might be displayed in a printer that is different from the printer 100. To address such a situation, when the QR code is captured in T924 (i.e., when the public key PPK1*b*, etc. are obtained in T926), the terminal 10 may send a signal (such as the PRReq) including a predetermined letter string (SSID "NOT DISPLAY") for stopping to display the QR code by broadcast. In this case, the aforementioned different printer stops displaying the QR code when it receives this signal. Similarly, when the QR code is captured in T824 of FIG. 9, the terminal 10 may send the signal including the above predetermined letter string by broadcast. In another variant, when the AReq is received in T930 of FIG. 10, the printer 100 may send the signal including the above predetermined letter string by broadcast. Similarly, when the AReq is received in T830 of FIG. 9, the printer 100 may send the signal including the above predetermined letter string by broadcast.

(Variant 16) The printer 100 may autonomously shift to the G/O state without executing the GN when the PDRes is sent to terminal 10 in T912 of FIG. 10. Similarly, the printer 100 may autonomously shift to the G/O state without executing the GN when the PDRes is sent to terminal 20 in T1012 of FIG. 11.

(Variant 17) The "communication device" may not be the printer, and may be another device such as a scanner, a multi-function peripheral, a portable terminal, a PC, and a server.

(Variant 18) In each of the embodiments above, the respective processes of FIGS. 2 to 11 are executed by software (i.e., the program 136), however, at least one of these processes may be realized by hardware such as a logic circuit.

What is claimed is:

1. A communication device comprising:
an output unit;
a wireless interface;
a processor; and
a memory storing computer-readable instructions therein, the computer-readable instructions, when executed by the processor, causing the communication device to:
receive a first specific signal from a first external device via the wireless interface;
in response to the first specific signal being received from the first external device, cause the output unit to output first specific information obtained by using a first public key, wherein the first public key is obtained by the first external device due to the first specific information being outputted, and wherein the first specific information is not outputted before the first specific signal is received from the first external device;
receive, via the wireless interface, a first authentication request in which the first public key is used from the first external device which has obtained the first public key;
in a case where the first authentication request is received from the first external device, send a first authentication response to the first external device via the wireless interface; and
in a case where the first authentication response is sent to the first external device, establish a first wireless connection with the first external device via the wireless interface.

2. The communication device as in claim 1,
wherein the computer-readable instructions, when executed by the processor, further cause the communication device to:
receive a second specific signal different from the first specific signal from a second external device via the wireless interface;
in a case where the second specific signal is received from the second external device, cause the output unit to output second specific information obtained by using a second public key, wherein the second public key is obtained by the second external device due to the second specific information being outputted;
receive, via the wireless interface, a second authentication request in which the second public key is used from the second external device which has obtained the second public key;
in a case where the second authentication request is received from the second external device, send a second authentication response to the second external device via the wireless interface; and
in a case where the second authentication response is sent to the second external device, establish a second wireless connection with an access point via the wireless interface.

3. The communication device as in claim 2, wherein
the first specific information is obtained by using the first public key and a first MAC address assigned to the wireless interface,
the first public key and the first MAC address are obtained by the first external device due to the first specific information being outputted,
the first authentication request includes the first MAC address as a destination MAC address,
the second specific information is obtained by using the second public key and a second MAC address assigned to the wireless interface, the second MAC address being different from the first MAC address,
the second public key and the second MAC address are obtained by the second external device due to the second specific information being outputted, and
the second authentication request includes the second MAC address as a destination MAC address.

4. The communication device as in claim 1,
wherein the computer-readable instructions, when executed by the processor, further cause the communication device to:
receive a third specific signal from a third external device via the wireless interface, wherein in a case where the third specific signal is received from the third external device, the first specific information is not outputted; and
in a case where the third specific signal is received from the third external device, establish a third wireless connection with the third external device via the wireless interface without receiving an authentication request from the third external device.

5. The communication device as in claim 4, wherein
a type of the first specific signal is identical to a type of the third specific signal,
the first specific signal includes first predetermined information, and
the third specific signal includes second predetermined information different from the first predetermined information.

6. The communication device as in claim 1, wherein
in a case where the first specific signal is received from a fourth external device via the wireless interface during a period from when the first specific information is outputted to when the first wireless connection with the first external device is established, the first specific information is not outputted.

7. The communication device as in claim 1, wherein
the first specific information is a QR code (registered trademark) obtained by coding the first public key, and
the first public key is obtained by the first external device in response to the QR code being captured by the first external device.

8. The communication device as in claim 1, wherein
the output unit is a display unit configured to display an image, and
the first specific information is displayed on the output unit which is the display unit.

9. The communication device as in claim 8,
wherein the computer-readable instructions, when executed by the processor, further cause the communication device to:
in the case where the first specific signal is received from the first external device, cause the output unit which is the display unit to display an instruction screen for instructing displaying of the first specific information,
wherein in a case where displaying of the first specific information is instructed in the instruction screen, the first specific information is displayed on the output unit which is the display unit.

10. The communication device as in claim 1, wherein
the computer-readable instructions, when executed by the processor, further cause the communication device to:
in the case where the first specific signal is received from the first external device, shift an operation state of the communication device from a non-respondent state to a first respondent state, the non-respondent state being a state of not sending an authentication response, and the first respondent state being a state of sending the first authentication response in response to receiving the first authentication request including a first MAC address assigned to the wireless interface as a destination MAC address,
wherein in a case where the first authentication request is received from the first external device after the operation state of the communication device has been shifted to the first respondent state, the first authentication response is sent to the first external device.

11. The communication device as in claim 10, wherein
the first respondent state is a state of monitoring receipt of the first authentication request in which a predetermined communication channel is used and sending the first authentication response in response to receiving the first authentication request in which the predetermined communication channel is used, the predetermined communication channel having been determined in advance in the communication device, and
in a case where the first authentication request in which the predetermined communication channel is used is received from the first external device after the operation state of the communication device has been shifted to the first respondent state, the first authentication response is sent to the first external device.

12. The communication device as in claim 10, wherein
the computer-readable instructions, when executed by the processor, further cause the communication device to:
in a case where a specific condition is satisfied after the operation state of the communication device has been shifted to the first respondent state, shift the operation state of the communication device from the first respondent state to the non-respondent state.

13. The communication device as in claim 1, wherein
the computer-readable instructions, when executed by the processor, further cause the communication device to:
in the case where the first authentication response is sent to the first external device, cause the communication device to operate as a Configurator according to Device Provisioning Protocol (DPP) scheme of a Wi-Fi standard,
wherein the first external device operates as an Enrollee according to the DPP scheme.

14. A communication device comprising:
a wireless interface;
a processor; and
a memory storing computer-readable instructions therein, the computer-readable instructions, when executed by the processor, causing the communication device to:
receive a first specific signal from a first external device via the wireless interface;
in a case where the first specific signal is received from the first external device, shift an operation state of the communication device from a non-respondent state to a first respondent state, the non-respondent state being a state of not sending an authentication response, and the first respondent state being a state of sending a first authentication response in response to receiving a first authentication request including a first MAC address assigned to the wireless interface as a destination MAC address;
receive the first authentication request from the first external device via the wireless interface;
in a case where the first authentication request is received from the first external device after the operation state of the communication device has been shifted to the first respondent state, send the first authentication response to the first external device via the wireless interface; and
in a case where the first authentication response is sent to the first external device, establish a first wireless connection with the first external device via the wireless interface.

15. The communication device as in claim 14, wherein
the computer-readable instructions, when executed by the processor, further cause the communication device to:
receive a second specific signal different from the first specific signal from a second external device via the wireless interface;
in a case where the second specific signal is received from the second external device, shift the operation state of the communication device from the non-respondent state to a second respondent state, the second respondent state being a state of sending a second authentication response in response to receiving a second authentication request including a second MAC address as a destination MAC address, the second MAC address being assigned to the wireless interface and different from the first MAC address;
receive the second authentication request from the second external device via the wireless interface;
in a case where the second authentication request is received from the second external device after the operation state of the communication device has been shifted to the second respondent state, send the second authentication response to the second external device via the wireless interface; and
in a case where the second authentication response is sent to the second external device, establish a second wireless connection with an access point via the wireless interface.

16. The communication device as in claim 14,
wherein the computer-readable instructions, when executed by the processor, further cause the communication device to:
receive a third specific signal from a third external device via the wireless interface, wherein in a case where the third specific signal is received from the third external device, the operation state of the communication device is not shifted to the first respondent state; and
in a case where the third specific signal is received from the third external device, establish a third wireless connection with the third external device via the wireless interface without receiving an authentication request from the third external device.

17. The communication device as in claim 16, wherein a type of the first specific signal is identical to a type of the third specific signal,
the first specific signal includes first predetermined information, and
the third specific signal includes second predetermined information different from the first predetermined information.

18. The communication device as in claim 14, wherein
the first respondent state is a state of monitoring receipt of the first authentication request in which a predetermined communication channel is used and sending the first authentication response in response to receiving the first authentication request in which the predetermined communication channel is used, the predetermined communication channel having been determined in advance in the communication device, and
in a case where the first authentication request in which the predetermined communication channel is used is received from the first external device after the operation state of the communication device has been shifted to the first respondent state, the first authentication response is sent to the first external device.

19. The communication device as in claim 14, wherein the computer-readable instructions, when executed by the processor, further cause the communication device to:
in a case where a specific condition is satisfied after the operation state of the communication device has been shifted to the first respondent state, shift the operation state of the communication device from the first respondent state to the non-respondent state.

20. A non-transitory computer-readable recording medium storing computer-readable instructions for a communication device,
wherein the computer-readable instructions, when executed by a processor of the communication device, cause the communication device to:
receive a first specific signal from a first external device via a wireless interface of the communication device;
in response to the first specific signal being received from the first external device, cause an output unit of the communication device to output first specific information obtained by using a first public key, wherein the first public key is obtained by the first external device due to the first specific information being outputted, and wherein the first specific information is not outputted before the first specific signal is received from the first external device;
receive, via the wireless interface, a first authentication request in which the first public key is used from the first external device which has obtained the first public key;
in a case where the first authentication request is received from the first external device, send a first authentication response to the first external device via the wireless interface; and
in a case where the first authentication response is sent to the first external device, establish a first wireless connection with the first external device via the wireless interface.

* * * * *